United States Patent
Kawashima

(10) Patent No.: US 11,028,853 B2
(45) Date of Patent: Jun. 8, 2021

(54) ELECTROMAGNETIC UNIT, MAGNETIC BEARING DEVICE, AND VACUUM PUMP

(71) Applicant: Edwards Japan Limited, Yachiyo (JP)

(72) Inventor: Toshiaki Kawashima, Yachiyo (JP)

(73) Assignee: Edwards Japan Limited, Yachiyo (JP)

( * ) Notice: Subject to any disclaimer, the term of this patent is extended or adjusted under 35 U.S.C. 154(b) by 587 days.

(21) Appl. No.: 15/741,945

(22) PCT Filed: Jul. 1, 2016

(86) PCT No.: PCT/JP2016/069573
§ 371 (c)(1),
(2) Date: Jan. 4, 2018

(87) PCT Pub. No.: WO2017/006844
PCT Pub. Date: Jan. 12, 2017

(65) Prior Publication Data
US 2019/0024667 A1    Jan. 24, 2019

(30) Foreign Application Priority Data
Jul. 7, 2015 (JP) .............................. JP2015-135951

(51) Int. Cl.
*H02K 7/09* (2006.01)
*F04D 19/04* (2006.01)
(Continued)

(52) U.S. Cl.
CPC ......... *F04D 19/042* (2013.01); *F04D 17/168* (2013.01); *F04D 19/048* (2013.01);
(Continued)

(58) Field of Classification Search
CPC .... F04D 19/042; F04D 19/048; F04D 17/168; F04D 19/04; F16C 32/048;
(Continued)

(56) References Cited

U.S. PATENT DOCUMENTS

2004/0164632 A1* 8/2004 Brunet ................ F16C 32/0446
310/90.5

FOREIGN PATENT DOCUMENTS

| CN | 101886670 A | 11/2010 |
|---|---|---|
| JP | 333219 U | 4/1991 |

(Continued)

OTHER PUBLICATIONS

Machine Translation, Hasegawa, JP-2002199655-A. Jul. 2002. (Year: 2002).*

(Continued)

*Primary Examiner* — Thomas Truong
(74) *Attorney, Agent, or Firm* — Shumaker & Sieffert, P.A.

(57) ABSTRACT

An electromagnet unit, a magnetic bearing device, and a vacuum pump with which displacement of a rotating body in a radial direction can be detected with precision. An upper electromagnet unit includes: radial electromagnets for supporting a rotor in a radial direction without contact; radial sensors for detecting displacement of the rotor in the radial direction; and a core around which coils are wound. Two radial electromagnets that are adjacent to each other in a circumferential direction of the core are disposed such that adjacent magnetic poles belonging respectively to the two radial electromagnets are homopolar, and a low magnetic flux interference region is formed between the two radial electromagnets. Each of the radial sensors is disposed in the low magnetic flux interference region.

14 Claims, 16 Drawing Sheets

(51) Int. Cl.
*H02K 11/00* (2016.01)
*F16C 32/04* (2006.01)
*H02K 11/21* (2016.01)
*F04D 17/16* (2006.01)

(52) U.S. Cl.
CPC ........ *F16C 32/048* (2013.01); *F16C 32/0446* (2013.01); *H02K 7/09* (2013.01); *H02K 11/21* (2016.01); *F16C 2360/45* (2013.01); *F16C 2380/26* (2013.01)

(58) Field of Classification Search
CPC .............. F16C 32/0446; F16C 2380/26; F16C 2360/45; F16C 32/04; H02K 7/09; H02K 11/21–11/215
USPC .............................................. 310/90.5, 68 B
See application file for complete search history.

(56) References Cited

FOREIGN PATENT DOCUMENTS

| | | | | |
|---|---|---|---|---|
| JP | H07238928 A | | 9/1995 | |
| JP | H09137828 A | | 5/1997 | |
| JP | 2000083340 A | | 3/2000 | |
| JP | 2001056026 A | | 2/2001 | |
| JP | 2002161919 A | | 6/2002 | |
| JP | 2002199655 A | * | 7/2002 | ............ F16C 32/048 |
| JP | 2002199655 A | | 7/2002 | |
| JP | 2005076792 A | * | 3/2005 | .......... F16C 32/0448 |
| JP | 2005076792 A | | 3/2005 | |
| JP | 3766013 B2 | | 4/2006 | |

OTHER PUBLICATIONS

Machine Translation, Kawashima, JP-2005076792-A, Mar. 2005. (Year: 2005).*

Extended Search Report from counterpart European Application No. 16821313.0, dated Feb. 13, 2019, 9 pp.

Translation and original International Search Report dated Sep. 20, 2016 in counterpart international application No. PCT/JP2016/069573, 6 pp.

* cited by examiner

ELECTROMAGNETIC UNIT, MAGNETIC BEARING DEVICE, AND VACUUM PUMP

This application is a U.S. national phase application under 37 U.S.C. § 371 of international application number PCT/JP2016/069573 filed on Jul. 1, 2016, which claims the benefit of priority to JP application number 2015-135951 filed Jul. 7, 2015. The entire contents of each of international application number PCT/JP2016/069573 and JP application number 2015-135951 are incorporated herein by reference.

TECHNICAL FIELD

The present disclosure relates to an electromagnet unit, a magnetic bearing device, and a vacuum pump.

BACKGROUND

A semiconductor manufacturing device, a liquid crystal manufacturing device, an electron microscope, a surface analysis device, a microprocessing device, and so on are known as devices that are subjected to exhaust processing using a vacuum pump in order to maintain a vacuum in the interior thereof. In the vacuum pump used in this type of device, a rotor blade rotates relative to a stator blade in order to exhaust gas in the device, and as a result, a vacuum is maintained in the interior of the device.

Japanese Patent Application Publication No. 2001-56026 discloses a magnetic bearing device having a radial electromagnet for supporting a rotating body in a radial direction without contact, a radial sensor for detecting displacement of the rotating body in the radial direction, and control means for adjusting a magnetic force of the radial electromagnet on the basis of an output of the radial sensor, wherein the radial electromagnet and the radial sensor are disposed such that adjacent magnetic poles thereof are homopolar.

SUMMARY

In a magnetic bearing device such as that described above, magnetic flux from the radial electromagnet is stronger than magnetic flux from the radial sensor, and therefore magnetic interference may occur between a radial electromagnet and a radial sensor disposed adjacent to each other, leading to variation in a magnetic characteristic of the radial sensor. As a result, displacement of the rotating body in the radial direction may not be detected correctly.

The present disclosure has been designed in consideration of this conventional problem, and an object thereof is to detect displacement of a rotating body in a radial direction with precision.

The present disclosure is proposed to achieve the object described above, and some examples include an electromagnet unit including: a plurality of radial direction magnetic force generating means for supporting a rotating body in a radial direction by magnetic force without contact; a plurality of radial direction displacement detecting means for detecting displacement of the rotating body in the radial direction; and a core around which coils of the plurality of radial direction magnetic force generating means and coils of the plurality of radial direction displacement detecting means are wound, wherein two of the plurality of radial direction magnetic force generating means that are adjacent to each other in a circumferential direction of the core are disposed such that adjacent magnetic poles belonging respectively to the two of the plurality of radial direction magnetic force generating means are homopolar, a low magnetic flux interference region is formed between the two of the plurality of radial direction magnetic force generating means, and each of the plurality of radial direction displacement detecting means is disposed in the low magnetic flux interference region.

According to this configuration, the plurality of radial direction magnetic force generating means are disposed such that the magnetic poles of adjacent radial direction magnetic force generating means are homopolar, and each of the plurality of radial direction displacement detecting means is disposed in the low magnetic flux interference region formed between the adjacent radial direction magnetic force generating means. Hence, magnetic interference received by the plurality of radial direction displacement detecting means due to the strong magnetic flux of the plurality of radial direction magnetic force generating means is suppressed, and as a result, the plurality of radial direction displacement detecting means can detect displacement of the rotating body in the radial direction with precision.

Some examples of the current disclosure include an electromagnet unit which, in addition to the configuration of the electromagnet unit described in claim 1, includes a magnetic shielding means for reducing a magnetic coupling between the plurality of radial direction magnetic force generating means and the plurality of radial direction displacement detecting means.

According to this configuration, the magnetic shielding means reduces the magnetic coupling between the plurality of radial direction magnetic force generating means and the plurality of radial direction displacement detecting means, and therefore magnetic interference received by the plurality of radial direction displacement detecting means due to the strong magnetic flux of the plurality of radial direction magnetic force generating means is suppressed. As a result, the plurality of radial direction displacement detecting means can detect displacement of the rotating body in the radial direction with further precision.

Some examples of the current disclosure include an electromagnet unit in which, in addition to the configuration of the electromagnet unit described in claim 2, the magnetic shielding means is a conductive shield ring attached to the plurality of radial direction magnetic force generating means.

According to this configuration, the conductive shield ring narrows a width of the magnetic flux generated by the plurality of radial direction magnetic force generating means such that magnetic interference between the plurality of radial direction magnetic force generating means and the plurality of radial direction displacement detecting means is reduced, and as a result, the plurality of radial direction displacement detecting means can detect displacement of the rotating body in the radial direction with precision.

Some examples of the current disclosure include an electromagnet unit in which, in addition to the configuration of the electromagnet unit described in claim 2, the magnetic shielding means is a conductive shield tube covering each of the coils of the plurality of radial direction displacement detecting means.

According to this configuration, the conductive shield tube narrows a width of the magnetic flux generated by the plurality of radial direction displacement detecting means such that magnetic interference between the plurality of radial direction magnetic force generating means and the plurality of radial direction displacement detecting means is reduced, and as a result, the plurality of radial direction displacement detecting means can detect displacement of the rotating body in the radial direction with precision.

Some examples of the current disclosure include an electromagnet unit in which, in addition to the configuration of the electromagnet unit described in any one of claims 1 to 4, the plurality of radial direction magnetic force generating means includes three magnetic poles arranged in the circumferential direction of the core so as to form two magnetic fluxes oriented in mutually opposite directions.

According to this configuration, the three magnetic poles of the plurality of radial direction magnetic force generating means form two magnetic fluxes oriented in mutually opposite directions such that magnetic flux leaking into the core from the plurality of radial direction magnetic force generating means is canceled out. Accordingly, magnetic interference between the plurality of radial direction magnetic force generating means and the plurality of radial direction displacement detecting means is reduced, and as a result, the plurality of radial direction displacement detecting means can detect displacement of the rotating body in the radial direction with precision.

Some examples of the current disclosure include an electromagnet unit in which, in addition to the configuration of the electromagnet unit described in any one of claims 1 to 4, the plurality of radial direction magnetic force generating means includes four magnetic poles arranged in the circumferential direction of the core so as to form two magnetic fluxes oriented in mutually opposite directions.

According to this configuration, the four magnetic poles of the plurality of radial direction magnetic force generating means form two magnetic fluxes oriented in mutually opposite directions such that magnetic flux leaking into the core from the plurality of radial direction magnetic force generating means is canceled out. Accordingly, magnetic interference between the plurality of radial direction magnetic force generating means and the plurality of radial direction displacement detecting means is reduced, and as a result, the plurality of radial direction displacement detecting means can detect displacement of the rotating body in the radial direction with precision.

Some examples of the current disclosure include an electromagnet unit in which, in addition to the configuration of the electromagnet unit described in any one of claims 1 to 4, the plurality of radial direction magnetic force generating means includes five or more magnetic poles arranged such that different polarities occur alternately in the circumferential direction of the core.

According to this configuration, the magnetic poles of the plurality of radial direction magnetic force generating means form a plurality of magnetic fluxes oriented in mutually opposite directions such that magnetic flux leaking into the core from the plurality of radial direction magnetic force generating means is canceled out. Accordingly, magnetic interference between the plurality of radial direction magnetic force generating means and the plurality of radial direction displacement detecting means is reduced, and as a result, the plurality of radial direction displacement detecting means can detect displacement of the rotating body in the radial direction with precision.

Some examples of the current disclosure include an electromagnet unit in which, in addition to the configuration of the electromagnet unit described in any one of claims 1 to 7, the plurality of radial direction displacement detecting means includes two mutually different magnetic poles arranged in an axial direction of the rotating body.

According to this configuration, the different magnetic poles of the plurality of radial direction displacement detecting means are arranged in the axial direction of the rotating body such that magnetic interference caused by the strong magnetic flux of the plurality of radial direction magnetic force generating means is canceled out, and as a result, the plurality of radial direction displacement detecting means can detect displacement of the rotating body in the radial direction with precision.

Some examples of the current disclosure include an electromagnet unit in which, in addition to the configuration of the electromagnet unit described in claim 8, the plurality of radial direction displacement detecting means includes two mutually different magnetic poles arranged in the circumferential direction of the core.

According to this configuration, the plurality of radial direction displacement detecting means includes two different magnetic poles arranged in the axial direction of the rotating body and two different magnetic poles arranged in the circumferential direction of the core, the magnetic poles being configured such that two N poles and two S poles are disposed alternately. Hence, magnetic interference caused by the strong magnetic flux of the plurality of radial direction magnetic force generating means is canceled out, and as a result, the plurality of radial direction displacement detecting means can detect displacement of the rotating body in the radial direction with precision.

Some examples of the current disclosure include an electromagnet unit in which, in addition to the configuration of the electromagnet unit described in claim 8 or 9, the core includes an eddy current reducing means for reducing eddy currents generated when magnetic flux generated by the plurality of radial direction displacement detecting means in the axial direction passes through the core.

According to this configuration, the eddy current reducing means reduces eddy currents generated when the magnetic flux of the plurality of radial direction displacement detecting means traverses the core in the axial direction, and therefore heat generation caused by the eddy currents can be suppressed.

Some examples of the current disclosure include an electromagnet unit in which, in addition to the configuration of the electromagnet unit described in claim 10, the eddy current reducing means is structured to reduce a passage sectional area where the magnetic flux generated by the plurality of radial direction displacement detecting means in the axial direction passes through the core.

According to this configuration, the passage sectional area where the magnetic flux generated by the plurality of radial direction displacement detecting means in the axial direction passes through the core is reduced by forming a predetermined region of the core through which the axial direction magnetic flux passes in mesh form, providing a hole or a slit therein, or the like, and as a result, heat generation occurring when the axial direction magnetic flux passes through the core can be suppressed.

Some examples of the current disclosure include an electromagnet unit in which, in addition to the configuration of the electromagnet unit described in any one of claims 1 to 11, the coils of the plurality of radial direction displacement detecting means is wound around two pawl portions projecting from the core toward an inner side in the radial direction, and a distance from a radial direction outer side end of each of the coil to a base end of the pawl portion is set to be greater than a distance between the two pawl portions.

According to this configuration, the magnetic flux of the plurality of radial direction displacement detecting means can be formed more easily between the plurality of radial direction displacement detecting means and the rotating body, and therefore magnetic flux leakage flowing into the core from the plurality of radial direction displacement detecting means can be reduced, enabling an improvement in sensor sensitivity in the plurality of radial direction displacement detecting means.

Some examples of the current disclosure include an electromagnet unit in which, in addition to the configuration of the electromagnet unit described in any one of claims 1 to 12, a magnetic pole center of at least one of the plurality of radial direction magnetic force generating means and a magnetic pole center of at least one of the plurality of radial direction displacement detecting means are disposed on an identical plane.

According to this configuration, by disposing the magnetic pole center of the plurality of radial direction magnetic force generating means and the magnetic pole center of the plurality of radial direction displacement detecting means on the same plane, the rotating body can be supported with precision.

Some examples of the current disclosure include a magnetic bearing device including: the electromagnet unit described in any one of claims 1 to 13; and a control means for controlling the electromagnet unit.

According to this configuration, the control means controls the magnetic force of the plurality of radial direction magnetic force generating means on the basis of the displacement of the rotating body in the radial direction, which is detected accurately by the plurality of radial direction displacement detecting means, and therefore oscillation of the rotating body can be suppressed.

Some examples of the current disclosure include a magnetic bearing device in which, in addition to the configuration of the magnetic bearing device described in claim 14, the magnetic shielding means is a conductive shield plate interposed between the electromagnet unit and a substrate for connecting the coils of the plurality of radial direction displacement detecting means.

According to this configuration, the conductive shield plate suppresses the magnetic coupling between the plurality of radial direction magnetic force generating means and the plurality of radial direction displacement detecting means, and therefore the plurality of radial direction displacement detecting means can detect displacement of the rotating body in the radial direction accurately. As a result, oscillation of the rotating body can be further suppressed.

Some examples of the current disclosure include a vacuum pump including the magnetic bearing device described above.

According to this configuration, the magnetic bearing device suppresses oscillation of the rotating body by controlling the magnetic force of the plurality of radial direction magnetic force generating means on the basis of the accurately detected radial direction displacement of the rotating body, and therefore the vacuum pump can be operated safely.

According to the present disclosure, the plurality of radial direction magnetic force generating means are disposed such that the magnetic poles of adjacent radial direction magnetic force generating means are homopolar, and each of the plurality of radial direction displacement detecting means is disposed in the low magnetic flux interference region formed between adjacent radial direction magnetic force generating means. Hence, magnetic interference received by the plurality of radial direction displacement detecting means due to the strong magnetic flux of the plurality of radial direction magnetic force generating means is suppressed, and as a result, the plurality of radial direction displacement detecting means can detect displacement of the rotating body in the radial direction with precision.

DETAILED DESCRIPTION

To achieve the object of detecting displacement of a rotating body in a radial direction with precision, the present disclosure is implemented by providing an electromagnet unit including: a plurality of radial direction magnetic force generating means for supporting a rotating body in a radial direction by magnetic force without contact; a plurality of radial direction displacement detecting means for detecting displacement of the rotating body in the radial direction; and a core around which coils of the radial direction magnetic force generating means and coils of the plurality of radial direction displacement detecting means are wound, wherein two of the plurality of radial direction magnetic force generating means that are adjacent to each other in a circumferential direction of the core are disposed such that adjacent magnetic poles belonging respectively to the two of the plurality of radial direction magnetic force generating means are homopolar, a low magnetic flux interference region is formed between the two of the plurality of radial direction magnetic force generating means, and each of the plurality of radial direction displacement detecting means is disposed in the low magnetic flux interference region.

Embodiments

Figure 1:
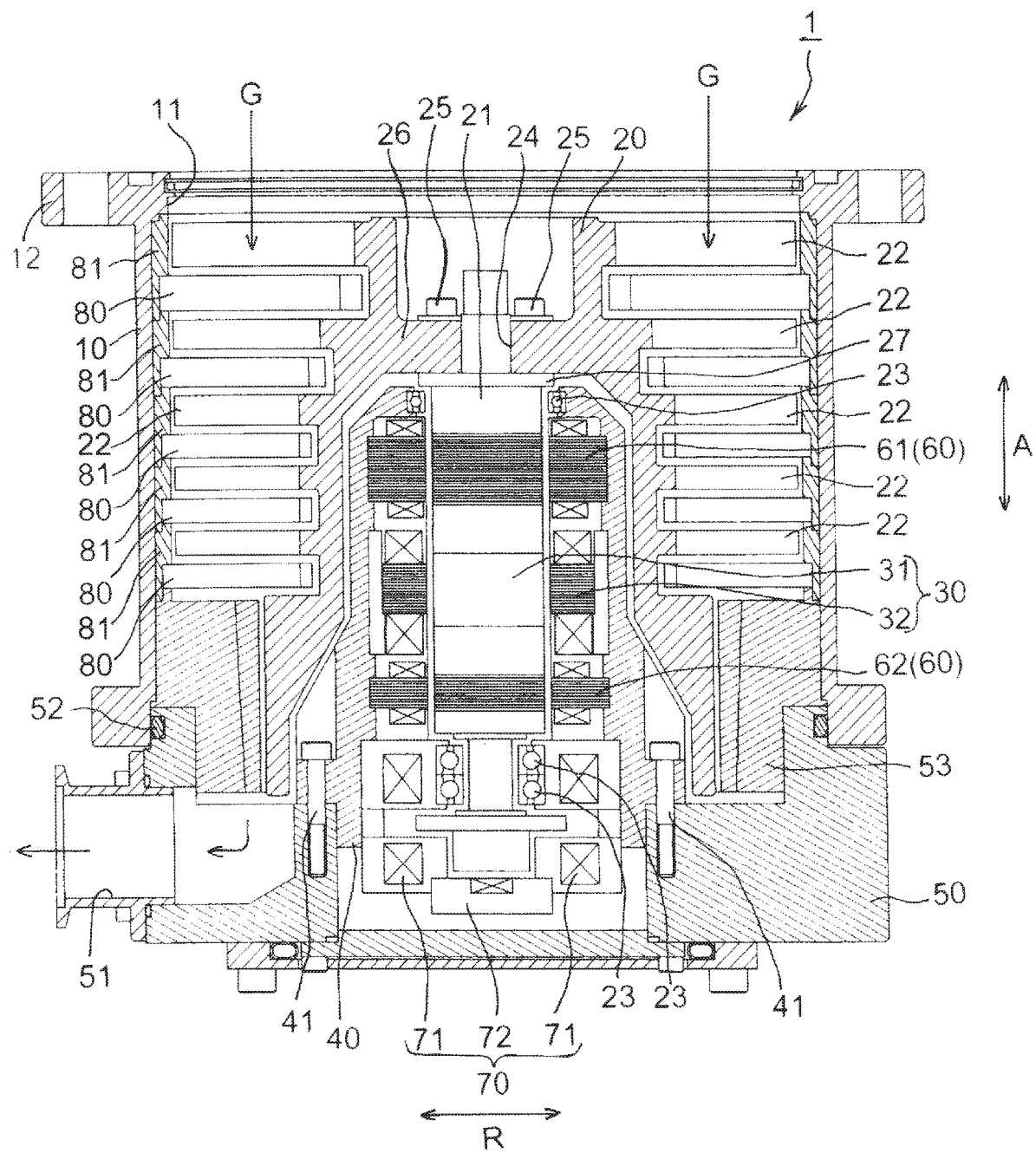
FIG. 1 is a vertical sectional view showing a vacuum pump to which an electromagnet unit according to a first embodiment of the disclosure is applied.

A vacuum pump 1 to which an electromagnet unit according to a first embodiment of the present disclosure is applied will be described below on the basis of the figures. Note that in the following description, the terms "upper" and "lower" refer respectively to an upstream side and a downstream side of an exhaust direction of exhaust gas G. In other words, in an axial direction A to be described below, an inlet port 11 side corresponds to an upper side and an outlet port 51 side corresponds to a lower side. FIG. 1 is a vertical sectional view showing a structure of the vacuum pump 1.

The vacuum pump 1 is a combination pump constituted by a turbo-molecular pump mechanism disposed substantially in an upper half and a thread groove pump mechanism disposed substantially in a lower half. The vacuum pump 1 includes a housing 10, a rotor 20 having a rotor shaft 21 that is supported rotatably in the housing 10, a drive motor 30 for rotating the rotor shaft 21, and a stator column 40 housing a part of the rotor shaft 21 and the drive motor 30.

The housing 10 is formed in a cylindrical shape. The gas inlet port 11 is formed in an upper end of the housing 10. The housing 10 is attached to a vacuum container such as a chamber of a semiconductor manufacturing device, not shown in the figure, via an upper flange 12. The gas inlet port 11 is connected to the vacuum container. The housing 10 is fixed to a base 50 so as to be placed on top of the base 50.

The rotor 20 includes the rotor shaft 21, and rotor blades 22 fixed to an upper portion of the rotor shaft 21 and arranged, or in other words provided side by side, concentrically about an axial center of the rotor shaft 21. In this embodiment, five rotor blades 22 are provided. Hereafter, an axial direction of the rotor shaft 21 will be referred to as the "axial direction A", and a radial direction of the rotor shaft 21 will be referred to as a "radial direction R".

The rotor shaft 21 is supported without contact by a radial direction magnetic bearing 60 and an axial direction magnetic bearing 70, to be described below. The radial direction magnetic bearing 60 includes an upper electromagnet unit 61 and a lower electromagnet unit 62. The axial direction magnetic bearing 70 includes an axial electromagnet 71. The axial direction magnetic bearing 70 is connected to a control unit, not shown in the figure. The control unit ensures that the rotor shaft 21 is supported so as to float in a predetermined position by controlling an excitation current of the axial electromagnet 71 on the basis of a detection value obtained by an axial sensor 72.

The rotor blades 22 are constituted by blades that are inclined at a predetermined angle, and are formed integrally with an upper portion outer peripheral surface of the rotor 20. Further, the plurality of rotor blades 22 are disposed radially about the rotor 20.

An upper portion and a lower portion of the rotor shaft 21 are inserted into a touchdown bearing 23. In a case where the rotor shaft 21 cannot be controlled, the rotor shaft 21 contacts the touchdown bearing 23 while rotating at high speed, thereby preventing damage to the vacuum pump 1.

The rotor 20 is attached integrally to the rotor shaft 21 by inserting the upper portion of the rotor shaft 21 into a boss hole 24, and in this condition, inserting bolts 25 into a rotor flange 26 and screwing the bolts 25 to a shaft flange 27.

The drive motor 30 includes a rotor 31 attached to an outer periphery of the rotor shaft 21, and a stator 32 disposed so as to surround the rotor 31. The stator 32 is connected to the aforementioned control unit, not shown in the figure, such that rotation of the rotor 20 is controlled by the control unit.

The stator column 40 is fixed to the base 50 via bolts 41 while placed on top of the base 50.

Stator blades 80 are provided between the rotor blades 22. In other words, the rotor blades 22 and the stator blades 80 are arranged alternately in multiple stages in the axial direction A. In this embodiment, the stator blades 80 are provided in five stages.

The stator blades 80 are formed in an annular shape, and each stator blade 80 includes a blade that is inclined in an opposite direction to the rotor blade 22 and a ring coupled to respective ends of the blade. The stator blades 80 are clamped and positioned in the axial direction A by spacers 81 disposed in stacked form on an inner peripheral surface of the housing 10. Further, the plurality of stator blades 80 are likewise disposed radially about the rotor 20.

Respective lengths of the blades forming the rotor blades 22 and the stator blades 80 are set to decrease gradually from the upper side toward the lower side in the axial direction A.

The gas outlet port 51 is formed in a lower portion side of the base 50. The gas outlet port 51 is connected to an auxiliary pump, not shown in the figure, so as to communicate therewith. As the rotor blades 22 rotate, the vacuum pump 1 conveys gas sucked in through the gas inlet port 11 from the upper side to the lower side in the axial direction A, and exhausts the gas to the outside through the gas outlet port 51. An O-ring 52 is interposed between the base 50 and the housing 10. A stator 53 having a screw thread portion engraved in an inner peripheral surface thereof is placed on the base 50.

Figure 2:
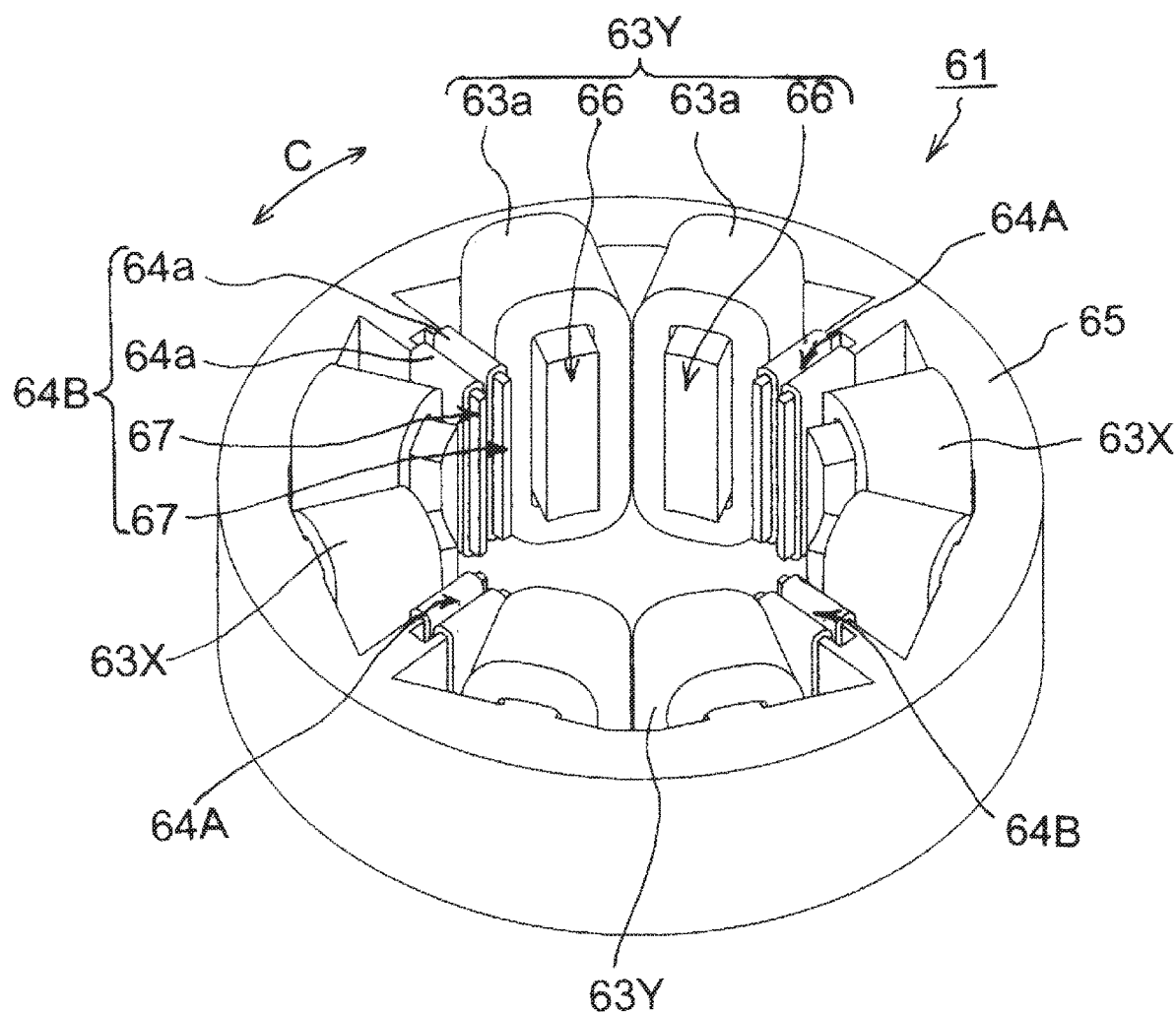
FIG. 2 is a perspective view showing an upper electromagnet unit of FIG. 1.
Figure 3:
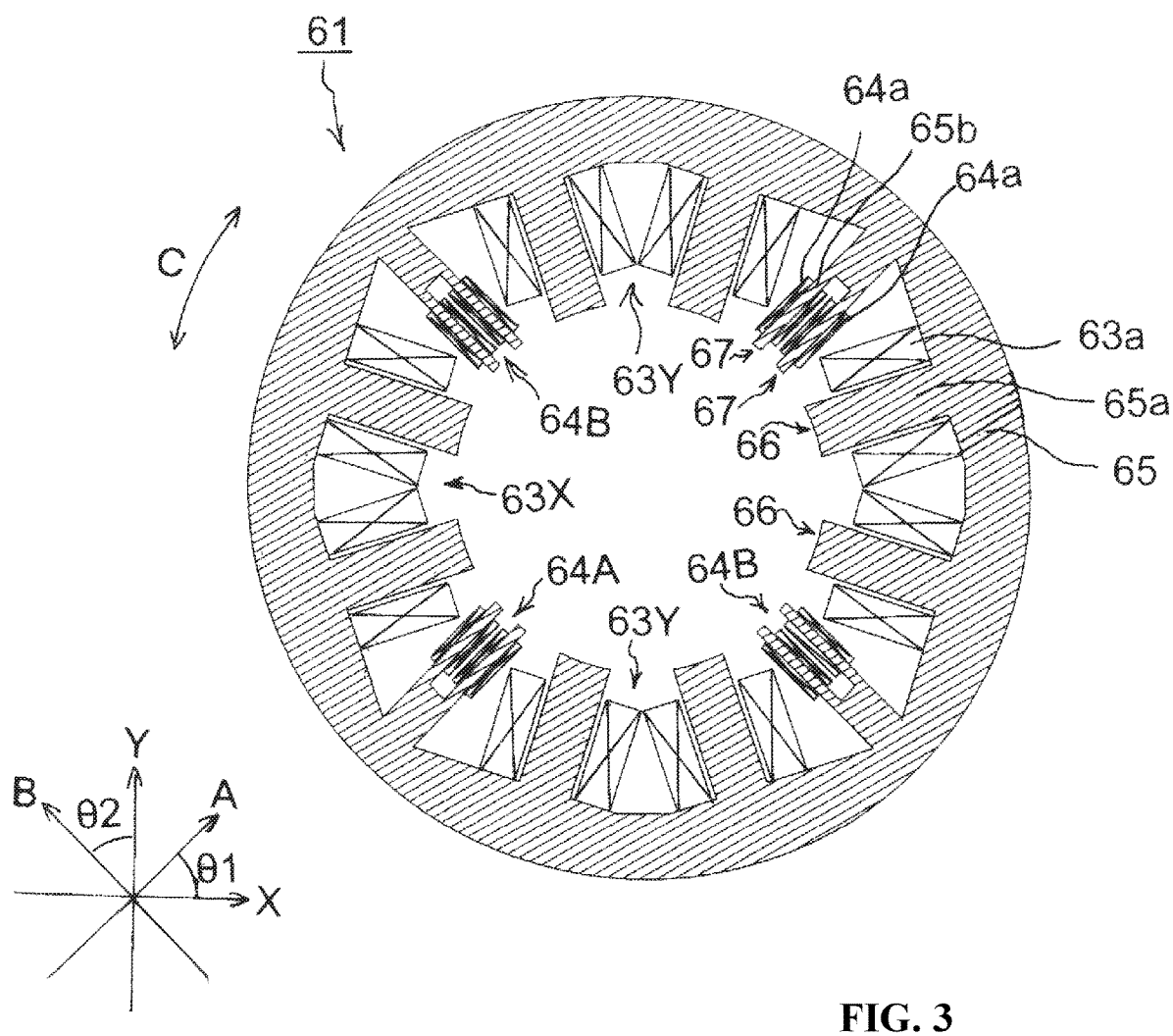
FIG. 3 is a horizontal sectional view of the upper electromagnet unit shown in FIG. 2.
Figure 4:
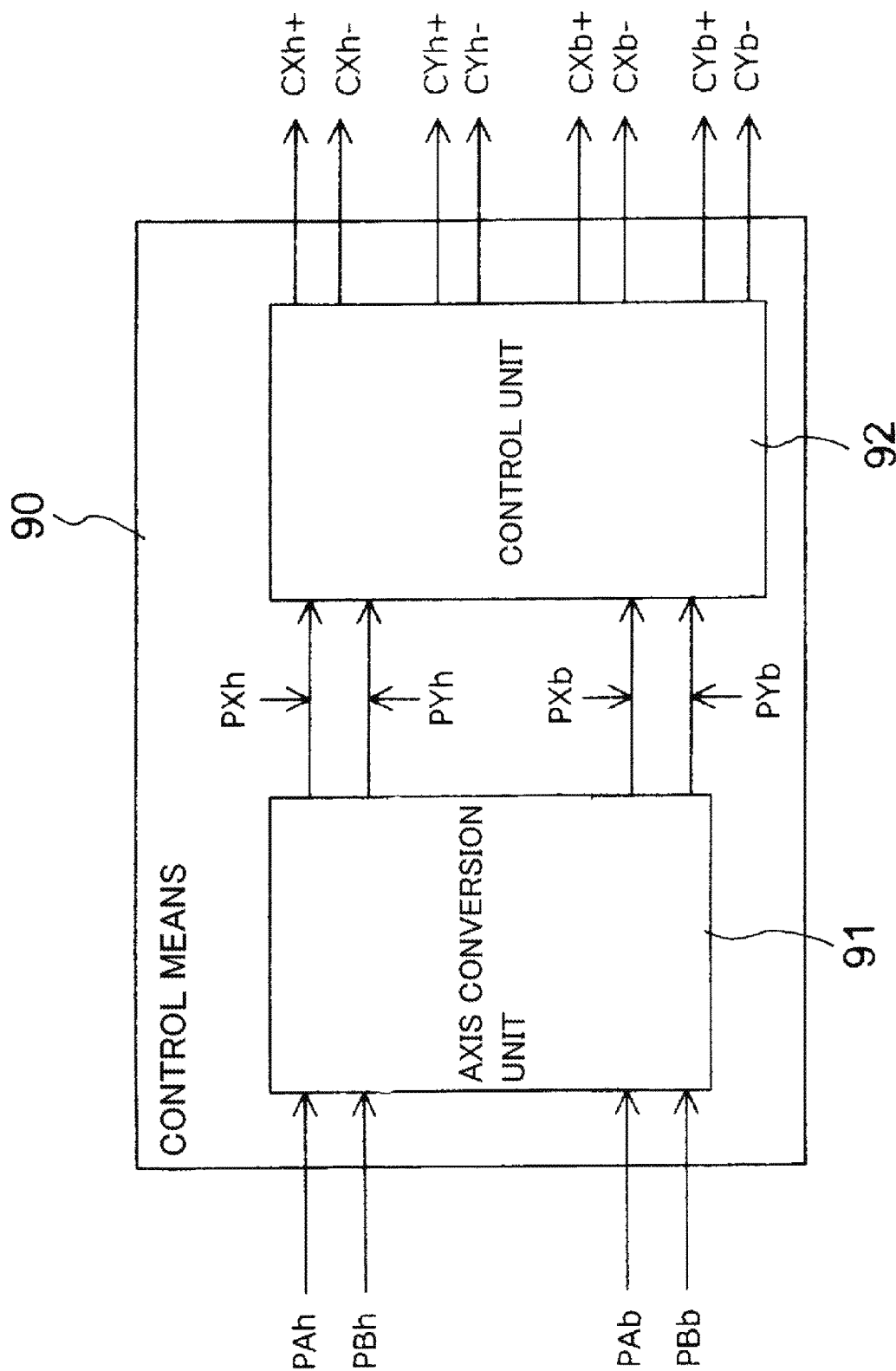
FIG. 4 is a schematic view showing a configuration of control means for controlling the upper electromagnet unit of FIG. 1.
Figure 5:
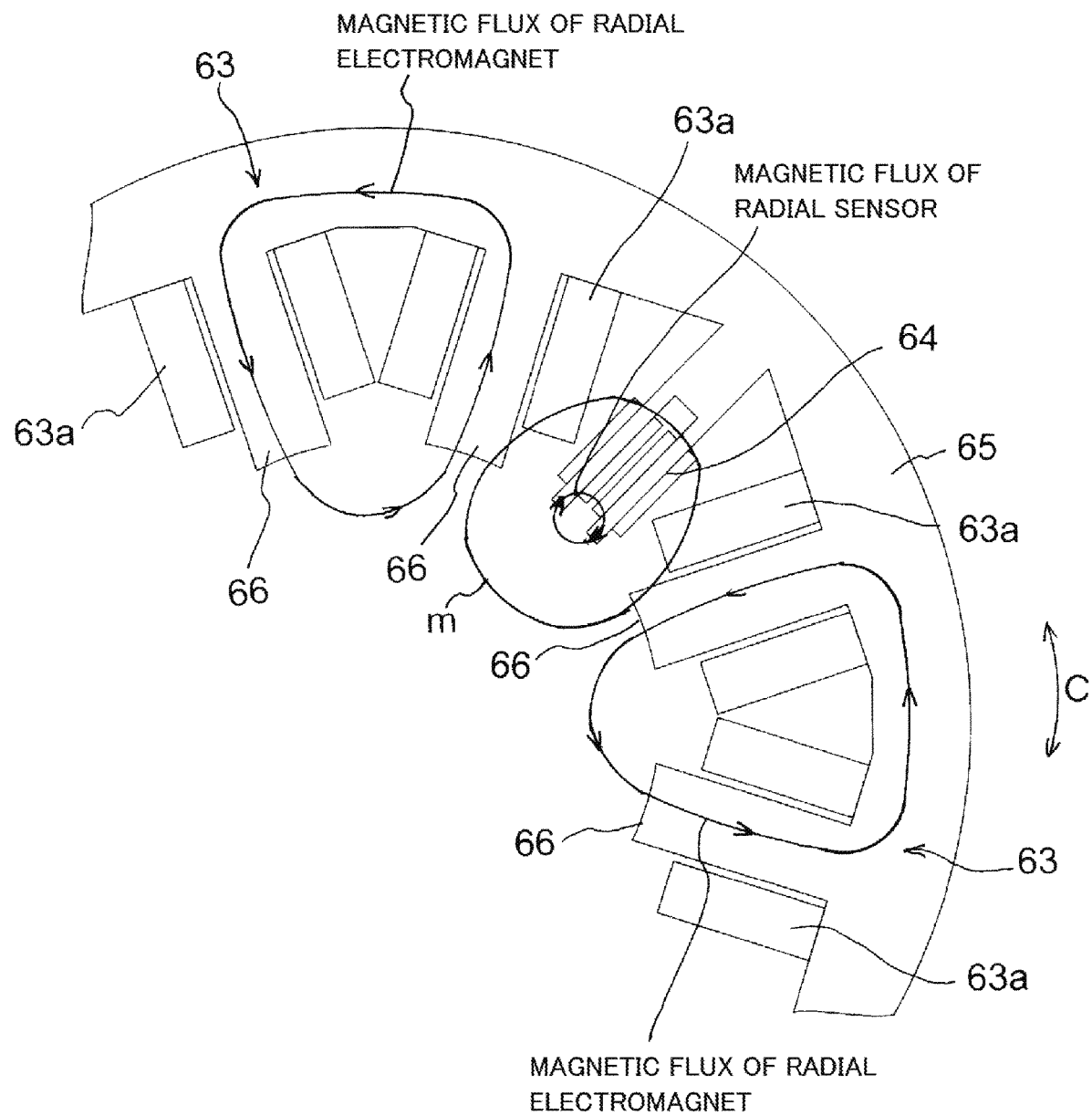
FIG. 5 is an enlarged view showing main parts of the upper electromagnet unit shown in FIG. 3, shading having been omitted therefrom to facilitate understanding.
Figure 6:
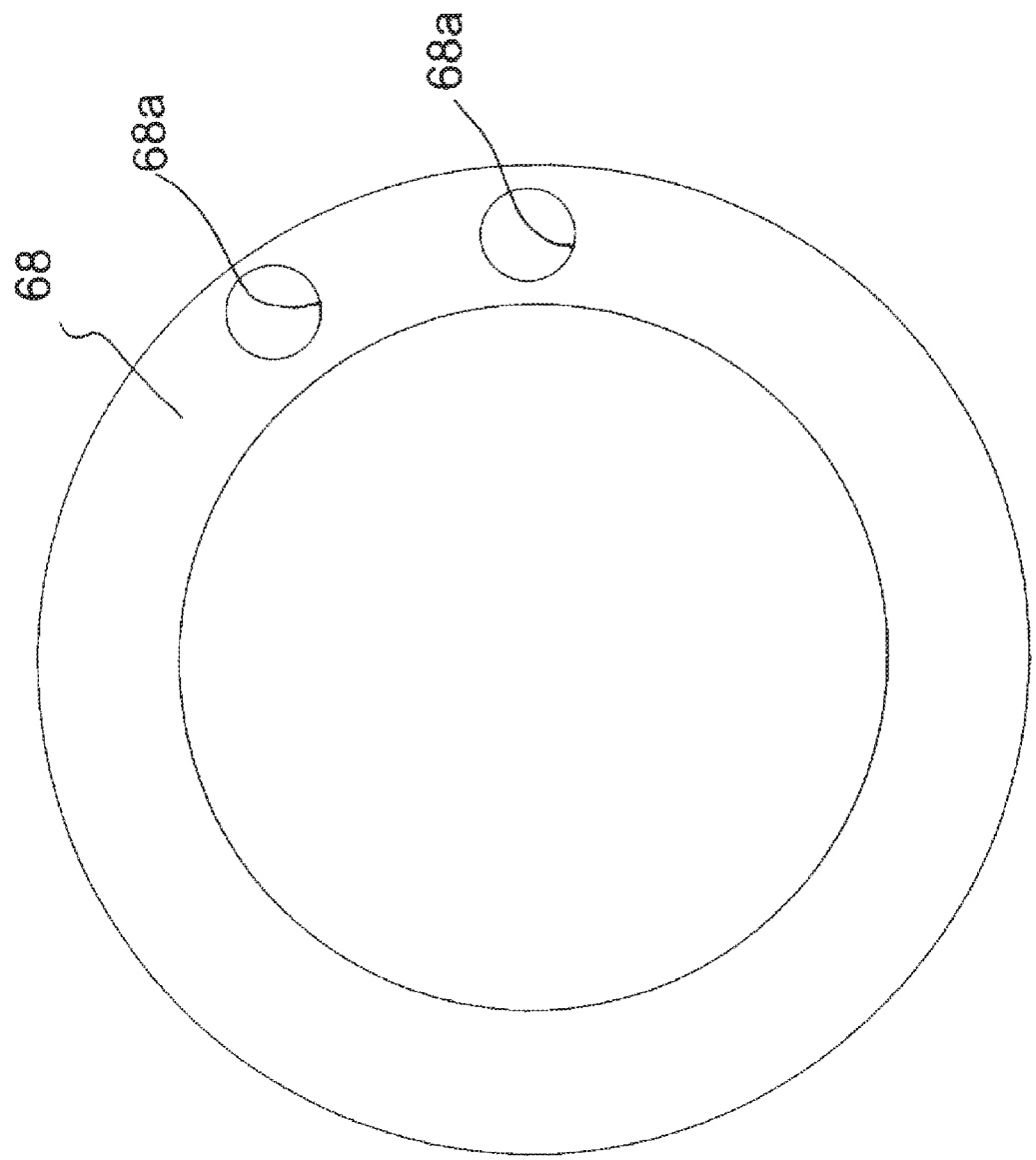
FIG. 6 is a plan view showing a shield plate used in a radial direction magnetic bearing device.
Figure 7:
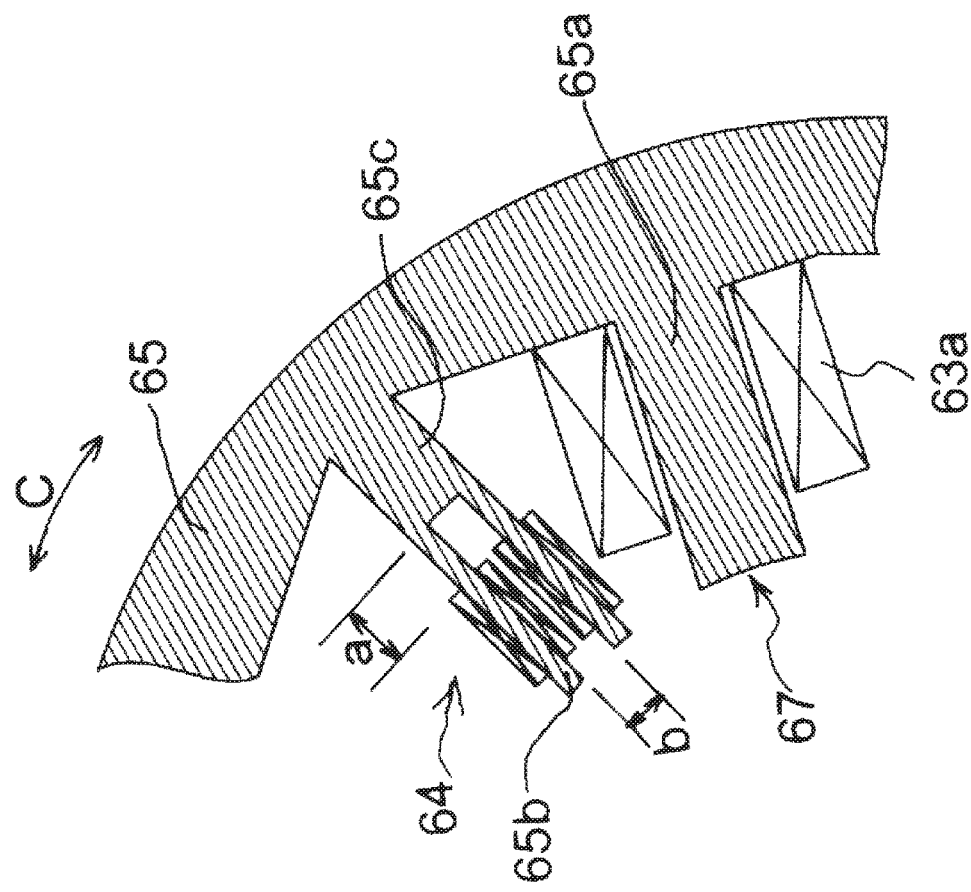
FIG. 7 is an enlarged view showing main parts of a radial sensor shown in FIG. 3.

Next, a specific configuration of the radial direction magnetic bearing 60 will be described on the basis of the figures. FIG. 2 is a perspective view showing the upper electromagnet unit 61. FIG. 3 is a horizontal sectional view of the upper electromagnet unit 61. FIG. 4 is a schematic view showing a configuration of control means 90 for controlling the upper electromagnet unit 61. FIG. 5 is an enlarged view showing main parts of the upper electromagnet unit 61, shading having been omitted to facilitate understanding. FIG. 6 is a plan view showing a shield plate 68 used in the radial direction magnetic bearing 60. FIG. 7 is an enlarged view showing main parts of a radial sensor 64. Note that since the upper electromagnet unit 61 and the lower electromagnet unit 62 are configured similarly, the structure of the upper electromagnet unit 61 will be described below as an example, and description relating to the structure of the lower electromagnet unit 62 will be omitted.

The upper electromagnet unit 61 includes four radial electromagnets 63 for supporting the rotor shaft 21 in the radial direction R by magnetic force without contact, and four radial sensors 64 for detecting displacement of the rotor shaft 21 in the radial direction R. Coils 63a of the radial electromagnets 63 and coils 64a of the radial sensors 64 are wound onto a single core 65, or in other words wound around the core 65 so as to be encircled thereby.

The radial electromagnets 63 are disposed at 90-degree intervals in a circumferential direction C of the core 65, and are disposed on either an X axis or a Y axis. Each radial electromagnet 63 includes a pair of magnetic poles 66 formed by winding the coils 63a onto projecting portions 65a of the core 65. The coils 63a are wound in mutually opposite directions so that the pair of magnetic poles 66 have different polarities. Further, coils 63a that are adjacent to each other via the radial sensor 64 are wound onto the core 65 in the same direction so that adjacent magnetic poles 66 belonging to radial electromagnets 63 that are adjacent to each other in the circumferential direction C of the core 65, or in other words magnetic poles 66 that are adjacent to each other via the radial sensor 64, have identical polarities. Note that in this embodiment, to differentiate between the radial electromagnets 63 according to directions in which the radial electromagnets 63 provide support, the radial electromagnets 63 that support the rotor shaft 21 without contact in an X axis direction have reference symbols constituted by a numeral with an X suffix, while the radial electromagnets 63 that support the rotor shaft 21 without contact in a Y axis direction have reference symbols constituted by a numeral with a Y suffix. To refer to the radial electromagnets 63 in general, meanwhile, a numeral will be used alone as the reference symbol.

The radial sensors 64 are respectively disposed between radial electromagnets 63 that are adjacent to each other in the circumferential direction C of the core 65, and each radial sensor 64 is disposed on either an A axis that is inclined by a predetermined angle θ1 relative to the X axis, or a B axis that is inclined by a predetermined angle θ2 relative to the Y axis. In this embodiment, the predetermined angles θ1 and θ2 are both set at 45 degrees. The radial sensor 64 is a well-known displacement sensor such as an inductance type displacement sensor, for example. Each radial sensor 64 includes a pair of magnetic poles 67 formed by winding the coils 64a around pawl portions 65b of the core 65. The coils 64a are wound in mutually opposite directions so that the pair of magnetic poles 67 have different polarities. Note that in this embodiment, to differentiate between the radial sensors 64 according to displacement detection directions thereof, the radial sensors 64 disposed on the A axis have reference symbols constituted by a numeral with an A suffix, while the radial sensors 64 disposed on the B axis have reference symbols constituted by a numeral with a B suffix. To refer to the radial sensors 64 in general, meanwhile, a numeral will be used alone as the reference symbol.

The radial sensor 64A detects displacement of the upper portion of the rotor shaft 21 in the A axis direction, and transmits a source displacement signal PAh corresponding to the displacement to the control means 90. Further, the radial sensor 64B detects displacement of the rotor shaft 21 in the B axis direction, and transmits a source displacement signal PBh corresponding to the displacement to the control means 90. Similarly, the radial sensor 64A of the lower electromagnet unit 62 and the radial sensor 64B of the lower electromagnet unit 62 respectively transmit a source displacement signal PAb corresponding to displacement of the lower portion of the rotor shaft 21 in the A axis direction and a source displacement signal PBb corresponding to displacement of the lower portion of the rotor shaft 21 in the B axis direction to the control means 90.

The control means 90 generates electromagnet drive signals for controlling the radial electromagnets 63 on the basis of the source displacement signals PAh, PAb, PBh, PBb. The control means 90 is a microcomputer such as a digital signal processor (DSP), for example. As shown in FIG. 4, the control means 90 includes an axis conversion unit 91 and a control unit 92. The axis conversion unit 91 calculates the displacement of the rotor shaft 21 in the X axis direction and the Y axis direction by adding an internal displacement signal PXh (PXh=PAh×cos θ1−PBh×sin θ2) to the source displacement signal PAh, adding an internal displacement signal PYh (PYh=PAh×sin θ1+PBh×cos θ2) to the source displacement signal PBh, adding an internal displacement signal PXb (PXb=PAb×cos θ1−PBb×sin θ2) to the source displacement signal PAb, and adding an internal displacement signal PYb (PYb=PAb×sin θ1+PBb× cos θ2) to the source displacement signal PBb.

The control unit 92 generates electromagnet drive signals CXh+, CXh− for driving the radial electromagnets 63X of the upper electromagnet unit 61 on the basis of the X axis direction and Y axis direction displacement of the rotor shaft 21, calculated by the axis conversion unit 91, and controls the radial electromagnets 63X accordingly. Similarly, the control unit 92 generates electromagnet drive signals CYh+, CYh− for driving the radial electromagnets 63Y of the upper electromagnet unit 61, electromagnet drive signals CXb+, CXb− for driving the radial electromagnets 63X disposed in the X axis direction of the lower electromagnet unit 62, and electromagnet drive signals CYb+, CYb− for driving the radial electromagnets 63Y disposed in the Y axis direction of the lower electromagnet unit 62, and controls the respective radial electromagnets 64 accordingly. Note that the "+" suffix attached to the reference symbols of the electromagnet drive signals denotes signals for controlling the radial electromagnets 63 disposed in a positive direction along the X axis or the Y axis, while the "−" suffix denotes signals for controlling the radial electromagnets 63 disposed in a negative direction along the X axis or the Y axis. Noise interference is reduced by setting a switching frequency of an input current (a sine wave) supplied to the radial electromagnet 63 at an even number multiple of a carrier frequency of an input current (a rectangular wave) supplied to the radial sensor 64.

Next, a disposal relationship between the radial electromagnets 63 and the radial sensor 64 will be described on the basis of FIG. 5. The coils 63a are wound so that the magnetic poles 66 of the radial electromagnets 63 that are adjacent to each other via the radial sensors 64 are homopolar. Accordingly, magnetic flux generated by the magnetic poles 66 of the radial electromagnets 63 that are adjacent to each other via the radial sensors 64 is canceled out, and as a result, low magnetic flux interference regions m in which the magnetic flux of the radial electromagnets 63 is reduced are formed respectively between radial electromagnets 63 that are adjacent to each other in the circumferential direction C of the core 65.

The radial sensors 64 are disposed in the low magnetic flux interference regions m. Typically, the magnetic flux generated by the radial electromagnet 63 is set to be stronger than the magnetic flux generated by the radial sensor 64, but by disposing the radial sensor 64 in the low magnetic flux interference region m, where the radial sensor 64 is less likely to be affected by the strong magnetic flux of the radial electromagnet 63, the radial sensor 64 is less likely to receive magnetic interference.

Further, in a case where a printed board, not shown in the figures, for connecting the coils 64a is mounted on the upper electromagnet unit 61, a shield plate 68 formed from a conductor, shown in FIG. 6, is preferably interposed between the upper electromagnet unit 61 and the control means 90. The shield plate 68 is formed in a disc shape, and connecting wires for connecting the coils 64a to the printed board are inserted into hole portions 68a formed in the shield plate 68. By employing the shield plate 68 in this manner, magnetic coupling between the radial electromagnets 63 and the radial sensors 64 is suppressed.

Further, as shown in FIG. 7, a distance from each of the coils 64a to a base end of the pawl portion 65b of the core 65, or in other words a distance a from a radial direction outer peripheral end of each of the coils 64a to the base end of the pawl portion 65b, is preferably set to be greater than an interval b between two pawl portions 65b. In so doing, magnetic flux is easily formed by the radial sensor 64 between the radial sensor 64 and the rotor shaft 21, or in other words within an air gap, and therefore magnetic flux leakage flowing from the radial sensor 64 into the core 65 can be reduced, enabling an improvement in sensor sensitivity in the radial sensor 64.

Furthermore, to suppress the occurrence of magnetic flux leakage in which a part of the magnetic flux of the radial electromagnet 63 leaks into the core 65, a magnetic resistance of the core 65 is preferably increased. The magnetic resistance of the core 65 may be increased using a method of, for example, providing a hole, a slit, or the like, not shown in the figures, in a projecting portion 65c connected to a base end side of the pawl portion 65b on which the radial sensor 64 is formed. Alternatively, a longitudinal sectional area of the projecting portion 65c may be formed to be smaller than a longitudinal sectional area of the projecting portion 65a. In so doing, magnetic flux leakage flowing from the radial electromagnet 63 into the core 65 is reduced.

Figure 8:
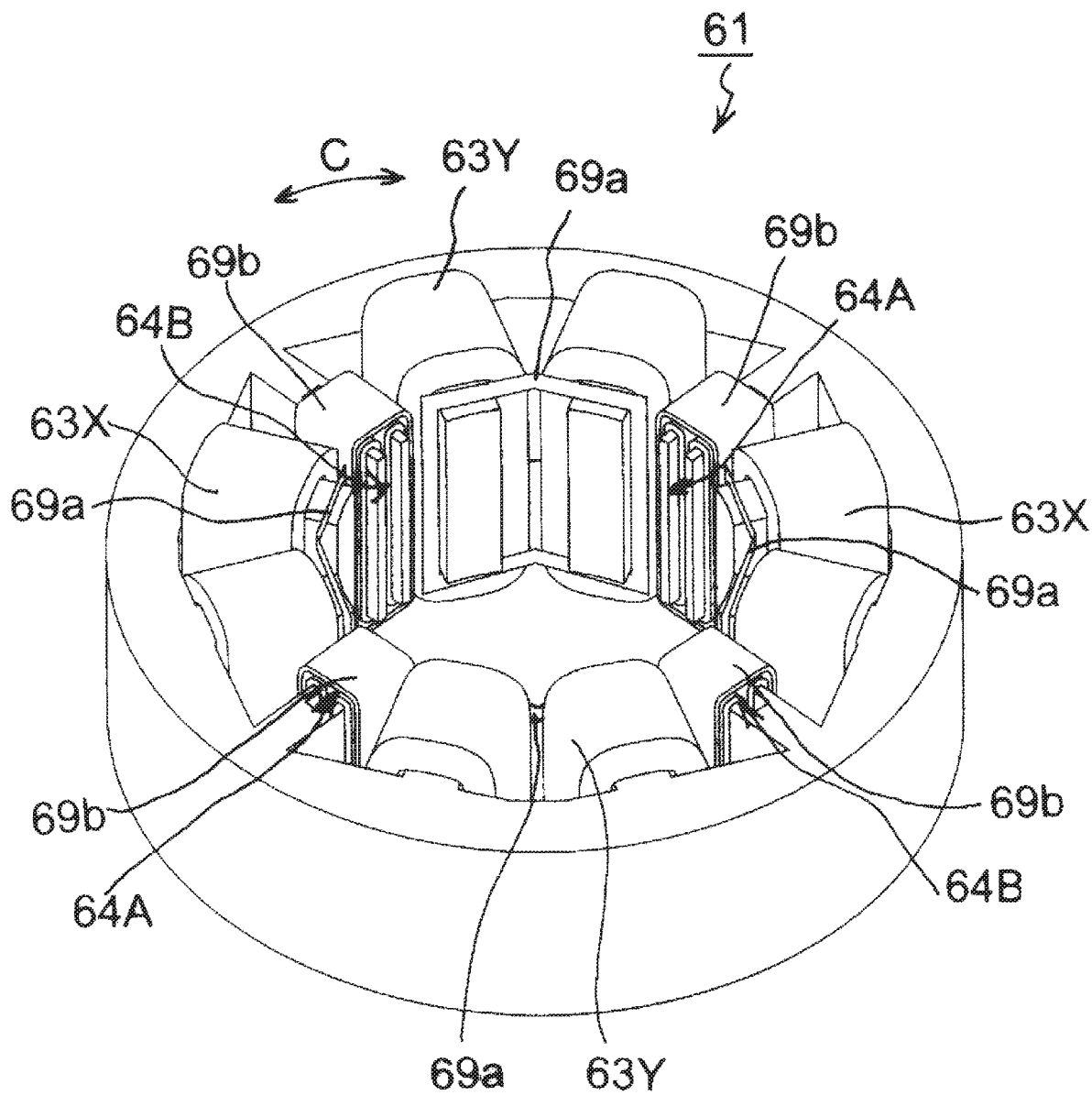
FIG. 8 is a perspective view showing a condition in which a shield tube and a shield ring are mounted on the electromagnet unit of FIG. 1.

Next, a modified example of this embodiment will be described on the basis of the figures. Note that configurations shared by this modified example and the above embodiment have been allocated identical reference symbols, and duplicate description thereof has been omitted. FIG. 8 is a perspective view showing the upper electromagnet unit 61 according to this modified example.

A conductive shield ring 69a formed from copper or the like and attached to the radial electromagnet 63 is provided on each radial electromagnet 63. The shield ring 69a narrows a width of the magnetic flux generated by the radial electromagnet 63 such that the magnetic coupling between the radial electromagnet 63 and the radial sensor 64 is reduced. The shield ring 69a is formed at a thickness of approximately 0.5 mm.

Further, a conductive shield tube 69b formed from copper or the like and provided to cover an outer periphery of each of the coils 64a of the radial sensor 64 is provided on each radial electromagnet 63. The shield tube 69b narrows a width of the magnetic flux generated by the radial sensor 64 such that the magnetic coupling between the radial electromagnet 63 and the radial sensor 64 is reduced. The shield tube 69b is formed at a thickness of approximately 0.5 mm, and may be insulated or uninsulated. Furthermore, the shield tube 69b may be formed by winding copper wire a plurality of times up to the aforesaid approximate thickness and joining end portions of the wire to each other.

Figure 9:
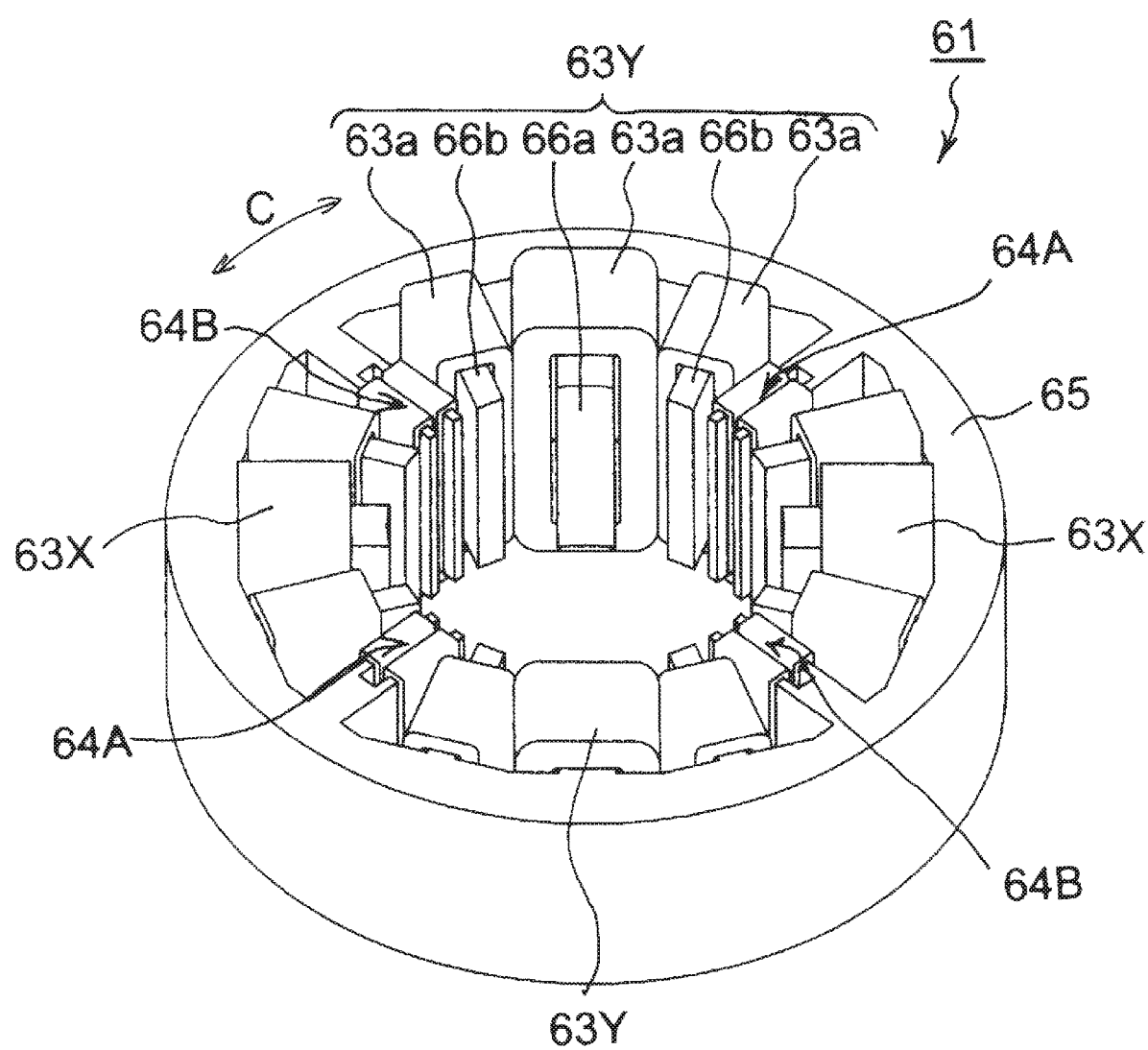
FIG. 9 is a perspective view showing an electromagnet unit according to a second embodiment of the present disclosure.
Figure 10:
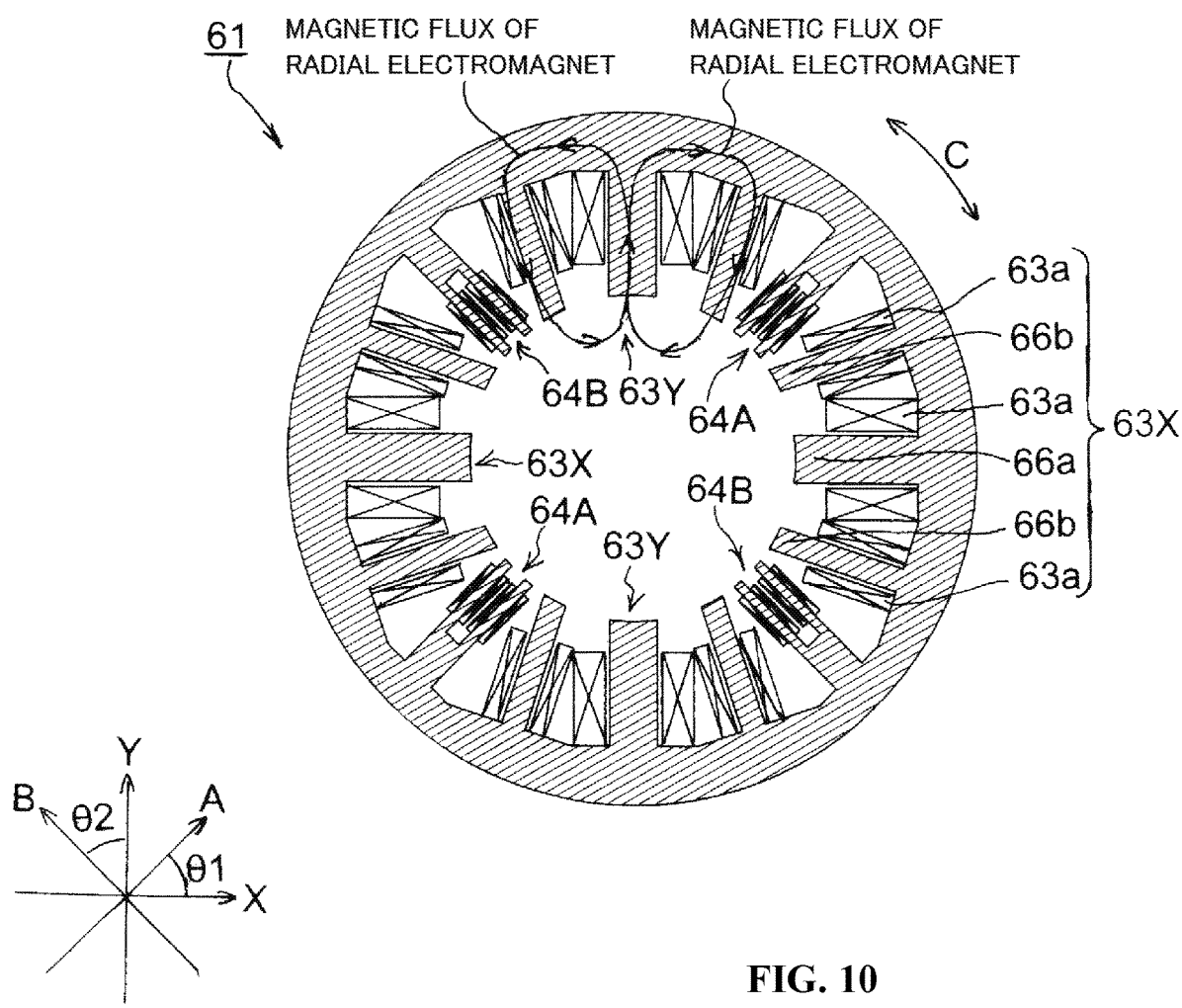
FIG. 10 is a horizontal sectional view showing the electromagnet unit of FIG. 9.

Next, the upper electromagnet unit 61 used in a second embodiment of the present disclosure will be described on the basis of the figures. Note that configurations shared by the upper electromagnet unit according to this embodiment and the upper electromagnet unit according to the first embodiment have been allocated identical reference symbols, and duplicate description thereof has been omitted. FIG. 9 is a perspective view showing the upper electromagnet unit 61 used in the second embodiment of the present disclosure. FIG. 10 is a horizontal sectional view of the upper electromagnet unit 61 shown in FIG. 9.

The radial electromagnets 63 provided in the upper electromagnet unit 61 are arranged in the circumferential direction C of the core 65, and each has three magnetic poles 66. More specifically, each radial electromagnet 63 includes a central magnetic pole 66a disposed in the center, and two side magnetic poles 66b disposed on respective sides of the central magnetic pole 66a, while the respective coils 63a of the central magnetic pole 66a and the side magnetic poles 66b are wound in mutually opposite directions so as to have different polarities. Further, side magnetic poles 66b that are adjacent to each other in the circumferential direction C of the core 65 via the radial sensor 64 have identical polarities. Note that the number of turns of the respective coils 63a of the central magnetic pole 66a is set to be approximately twice the number of turns of the coils 63a of the side magnetic pole 66b.

Hence, whereas in the upper electromagnet unit 61 according to the first embodiment, described above, the two magnetic poles 66 of each radial electromagnet 63 form one magnetic flux, in the upper electromagnet unit 61 according to this embodiment, the three magnetic poles 66a, 66b of the radial electromagnet 63 form two magnetic fluxes oriented in mutually opposite directions. Accordingly, symmetrical magnetic flux is formed by the upper electromagnet unit 61 such that magnetic flux leaking into the core 65 from the radial electromagnet 63 is canceled out, and as a result, magnetic interference between the radial electromagnet 63 and the radial sensor 64 is reduced.

Figure 11:
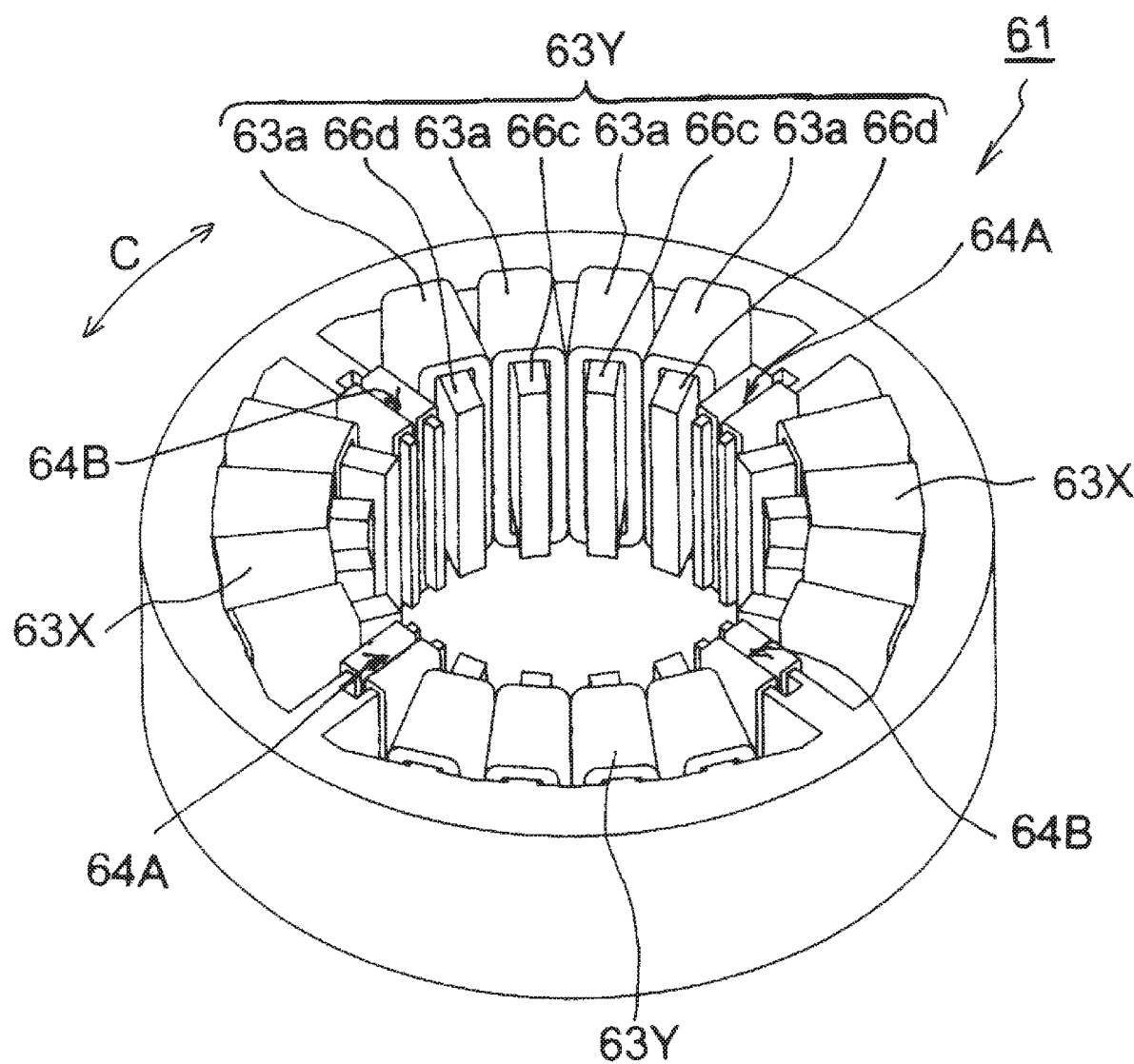
FIG. 11 is a perspective view showing an electromagnet unit according to a third embodiment of the present disclosure.
Figure 12:
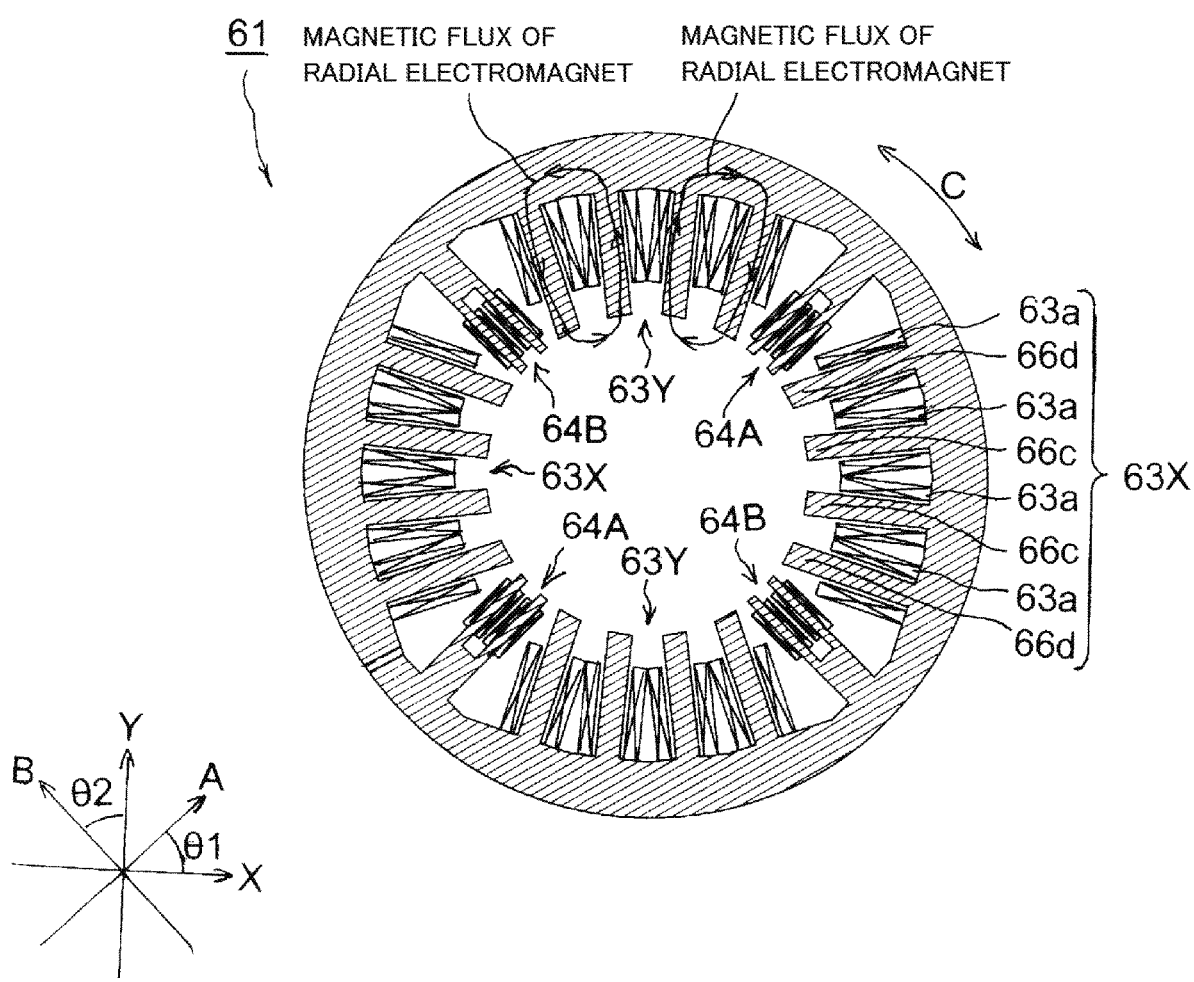
FIG. 12 is a horizontal sectional view showing the electromagnet unit of FIG. 11.

Next, the upper electromagnet unit 61 used in a third embodiment of the present disclosure will be described on the basis of the figures. Note that configurations shared by the upper electromagnet unit according to this embodiment and the upper electromagnet unit according to the first embodiment have been allocated identical reference symbols, and duplicate description thereof has been omitted. FIG. 11 is a perspective view showing the upper electromagnet unit 61 used in the third embodiment of the present disclosure. FIG. 12 is a horizontal sectional view of the upper electromagnet unit 61 shown in FIG. 11.

The radial electromagnets 63 provided in the upper electromagnet unit 61 are arranged in the circumferential direction C of the core 65, and each has four magnetic poles 66. More specifically, each radial electromagnet 63 includes two inside magnetic poles 66c disposed on an inner side in the circumferential direction C of the core 65, and two outside magnetic poles 66d disposed on respective sides of the inside magnetic poles 66c, while the respective coils 63a of the inside magnetic poles 66c and the outside magnetic poles 66d are wound in mutually opposite directions so as to have different polarities. Further, outside magnetic poles 66d that are adjacent to each other in the circumferential direction C of the core 65 via the radial sensor 64 have identical polarities.

Hence, whereas in the upper electromagnet unit 61 according to the first embodiment, described above, the two magnetic poles 66 of each radial electromagnet 63 form one magnetic flux, in the upper electromagnet unit 61 according to this embodiment, the four magnetic poles 66c, 66d of the radial electromagnet 63 form two magnetic fluxes oriented in mutually opposite directions. Accordingly, symmetrical magnetic flux is formed by the radial electromagnet 63 such that magnetic flux leaking into the core 65 from the radial electromagnet 63 is canceled out, and as a result, magnetic interference between the radial electromagnet 63 and the radial sensor 64 is reduced.

Furthermore, in contrast to the radial electromagnet 63 used in the third embodiment, described above, the magnetic poles 66c, 66d of the radial electromagnet 63 used in this embodiment can be formed in identical sizes, and therefore the radial electromagnets 63 can be manufactured at low cost.

Note that the radial electromagnets 63 of the second and third embodiments described above include either three or four magnetic poles 66 of different polarities arranged in the circumferential direction C of the core 65, but as long as the plurality of magnetic fluxes generated by the radial electromagnet 63 can be formed so as to cancel each other out, the number of magnetic poles 66 is not limited thereto, and five or more magnetic poles, for example, may be used.

Figure 13:
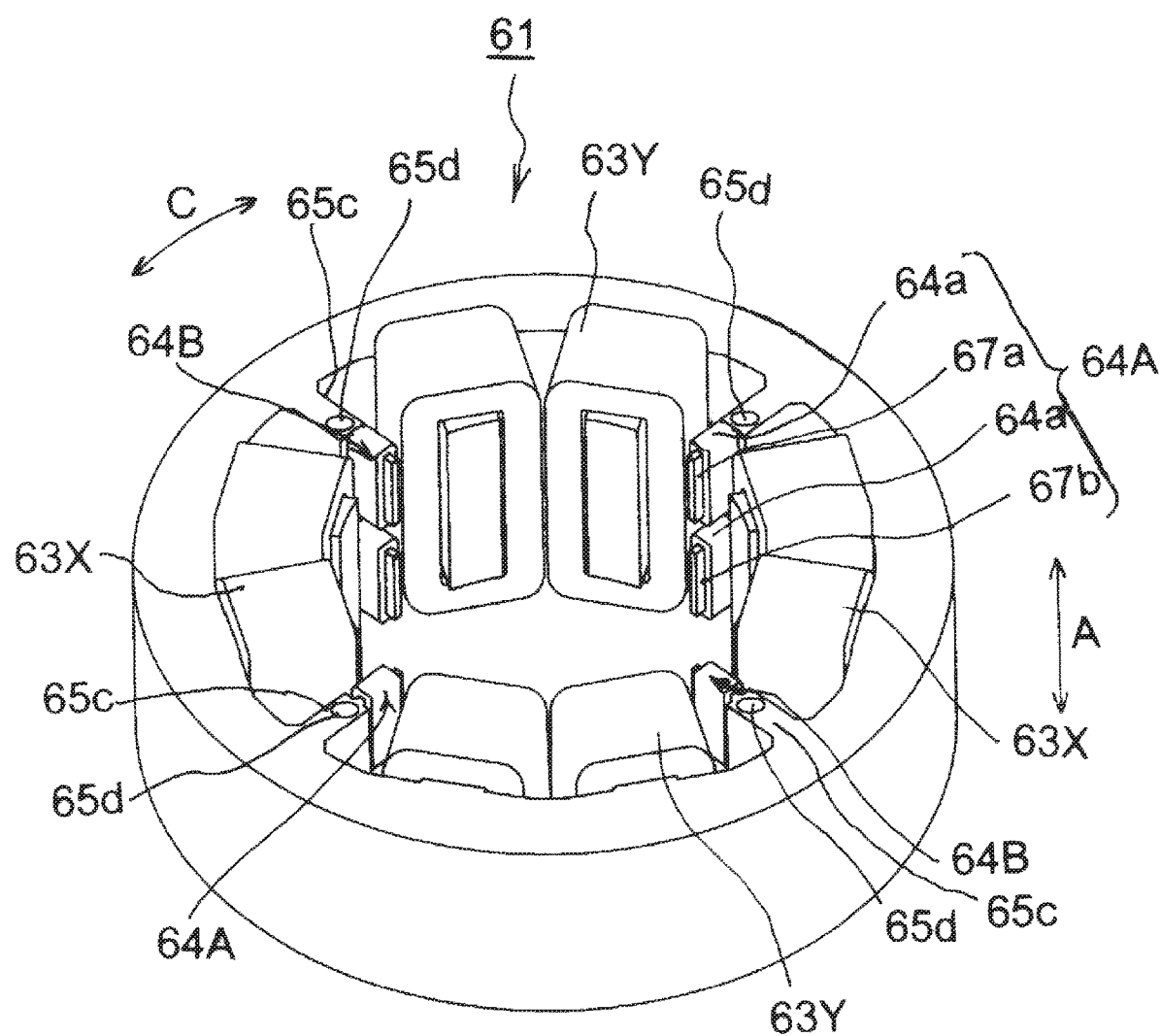
FIG. 13 is a perspective view showing an electromagnet unit according to a fourth embodiment of the present disclosure.
Figure 14:
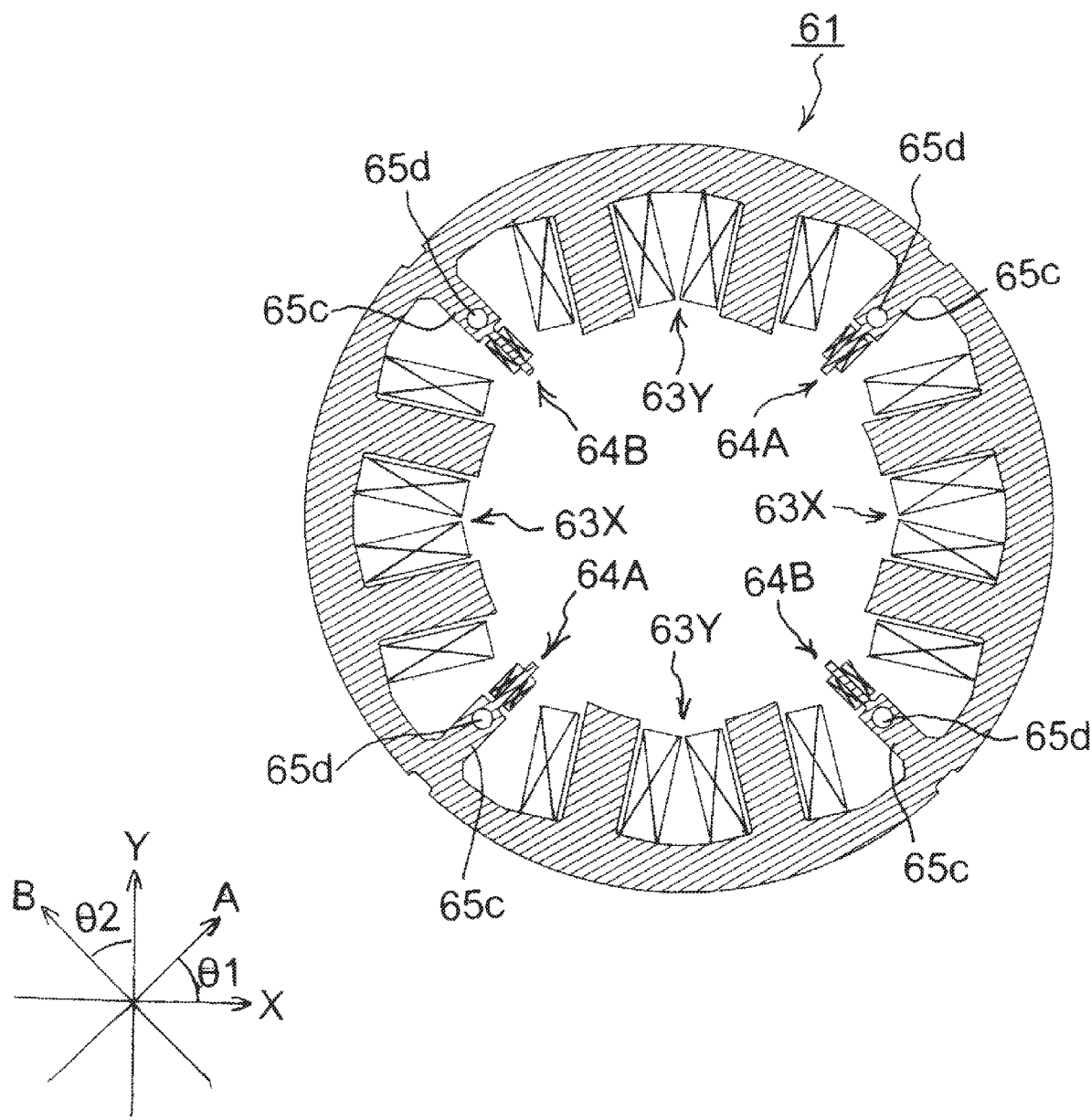
FIG. 14 is a horizontal sectional view showing the electromagnet unit of FIG. 13.

Next, the upper electromagnet unit 61 used in a fourth embodiment of the present disclosure will be described on the basis of the figures. Note that configurations shared by the upper electromagnet unit according to this embodiment and the upper electromagnet unit according to the first embodiment have been allocated identical reference symbols, and duplicate description thereof has been omitted. FIG. 13 is a perspective view showing the upper electromagnet unit 61 used in the fourth embodiment of the present disclosure. FIG. 14 is a horizontal sectional view of the upper electromagnet unit 61 shown in FIG. 13.

The radial sensors 64 provided in the upper electromagnet unit 61 each have an upper magnetic pole 67*a* and a lower magnetic pole 67*b* arranged in the axial direction A. More specifically, the respective coils 64*a* of the upper magnetic pole 67*a* and the lower magnetic pole 67*b* are wound in mutually opposite directions so as to have different polarities. Therefore, the magnetic flux of the radial sensor 64 is formed to be substantially orthogonal to the magnetic flux of the radial electromagnet 63.

Hence, whereas in the upper electromagnet unit 61 used in the first embodiment, described above, the magnetic flux of the radial electromagnet 63 and the magnetic flux of the radial sensor 64 are formed parallel to each other such that the magnetic flux of the radial sensor 64 may receive magnetic interference, in the upper electromagnet unit 61 according to this embodiment, the magnetic flux of the radial sensor 64 is formed to be substantially orthogonal to the magnetic flux of the radial electromagnet 63, and therefore magnetic interference caused by magnetic flux leaking from the radial electromagnet 63 into the radial sensor 64 is canceled out.

A reference symbol 65*d* in FIGS. 13 and 14 denotes a hole serving as eddy current reducing means for reducing a sectional area where magnetic flux generated by the radial sensor 64 in the axial direction A passes through the projecting portion 65*c* of the core 65. The eddy current reducing means may take any form with which a passage sectional area where the magnetic flux passes through the projecting portion 65*c* is reduced such that heat generated by eddy currents can be reduced, and instead, for example, the projecting portion 65*c* may be formed in mesh form or a slit may be provided in the projecting portion 65*c* to reduce the volume thereof.

Figure 15:
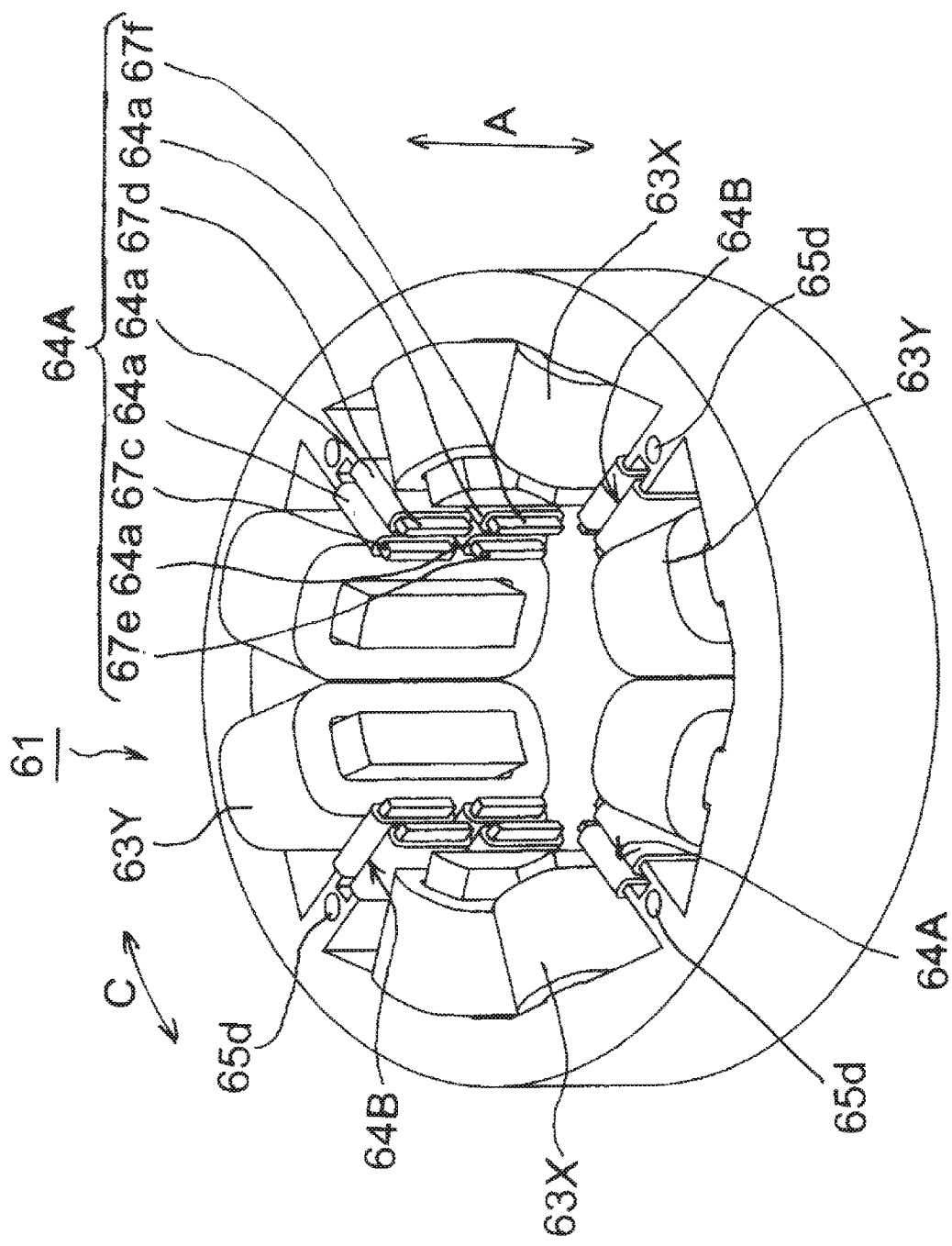
FIG. 15 is a perspective view showing an electromagnet unit according to a fifth embodiment of the present disclosure.
Figure 16:
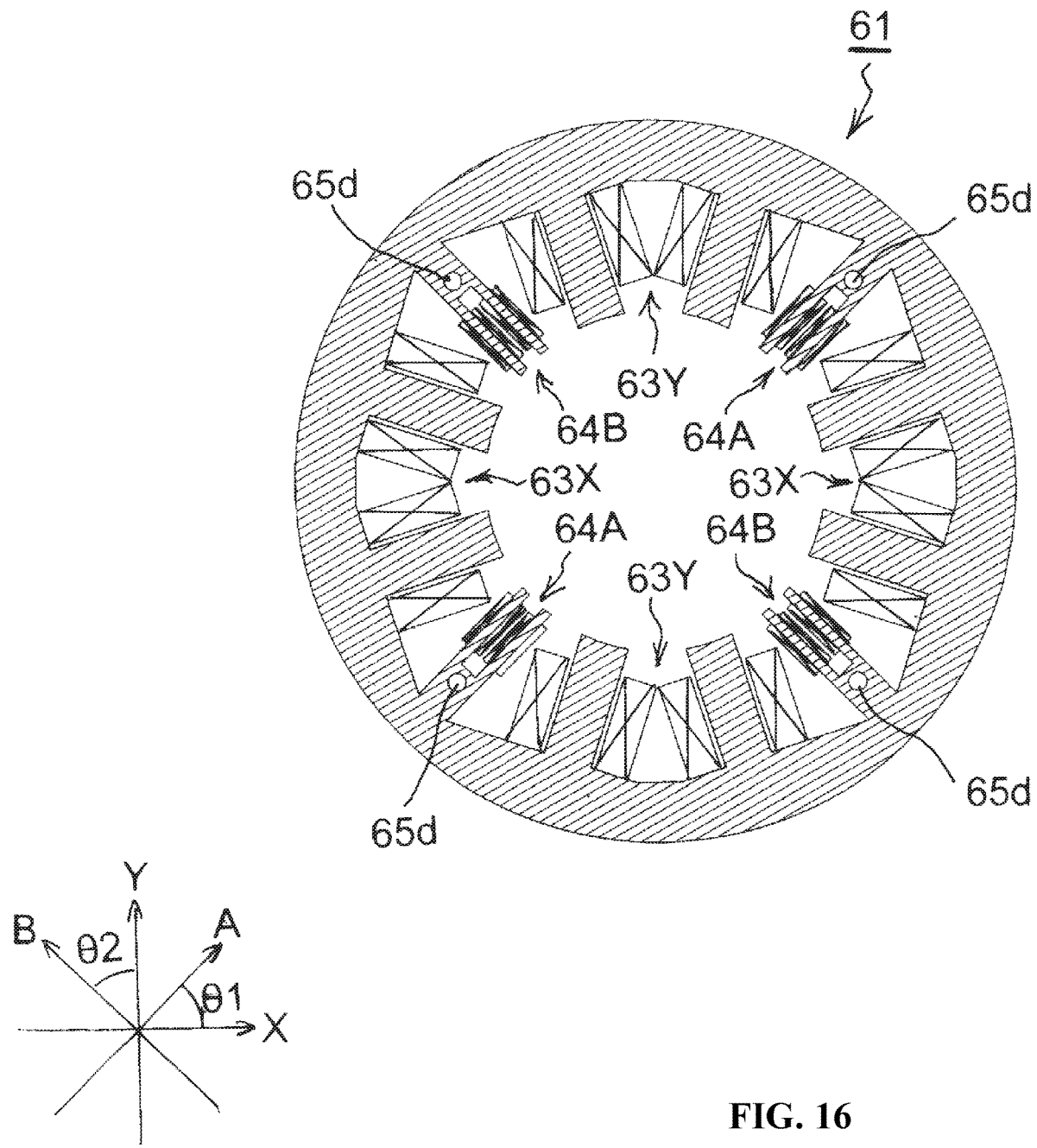
FIG. 16 is a horizontal sectional view showing the electromagnet unit of FIG. 15.

Next, the upper electromagnet unit 61 used in a fifth embodiment of the present disclosure will be described on the basis of the figures. Note that configurations shared by the upper electromagnet unit according to this embodiment and the upper electromagnet unit according to the first embodiment have been allocated identical reference symbols, and duplicate description thereof has been omitted. FIG. 15 is a perspective view showing the upper electromagnet unit 61 used in the fifth embodiment of the present disclosure. FIG. 16 is a horizontal sectional view of the upper electromagnet unit 61 shown in FIG. 15. Note that the reference symbol 65*d* in FIGS. 15 and 16 denotes the aforesaid hole serving as the eddy current reducing means.

The radial sensors 64 provided in the upper electromagnet unit 61 each have four magnetic poles 67*c*, 67*d*, 67*e*, 67*f* arranged respectively in the axial direction A and the circumferential direction C of the core 65. More specifically, the respective coils 64*a* of the upper magnetic poles 67*c*, 67*d* and the lower magnetic poles 67*e*, 67*f* arranged in the axial direction A of the radial sensor 64 are wound in mutually opposite directions so as to have different polarities. Likewise, the two upper magnetic poles 67*c*, 67*d* and the two lower magnetic poles 67*e*, 67*f* arranged in the circumferential direction C of the core 65 respectively have different polarities. In other words, the magnetic poles 67*c*, 67*d*, 67*e*, 67*f* having different polarities are disposed alternately. Therefore, the radial sensor 64 forms magnetic flux that is substantially orthogonal to the magnetic flux of the radial electromagnet 63 and magnetic flux that is substantially parallel to the magnetic flux of the radial electromagnet 63.

Hence, whereas in the upper electromagnet unit 61 used in the first embodiment, described above, the magnetic flux of the radial electromagnet 63 and the magnetic flux of the radial sensor 64 are formed parallel to each other such that the magnetic flux of the radial sensor 64 receives magnetic interference, in the upper electromagnet unit 61 according to this embodiment, magnetic interference caused by magnetic flux leaking from the radial electromagnet 63 into the radial sensor 64 is canceled out.

Further, magnetic flux can be formed between the upper magnetic poles 67*c*, 67*d* and between the lower magnetic poles 67*e*, 67*f* without passing through the core 65, and therefore magnetic resistance caused by passage through the core 65 can be suppressed.

Note that the upper electromagnet unit 61 and the lower electromagnet unit 62 may have mutually different structures. For example, the structure according to the first embodiment may be applied to the upper electromagnet unit 61, and the structure according to the modified example may be applied to the lower electromagnet unit 62. Typically, the upper electromagnet unit 61 is required to be disposed near a center of gravity of the rotor 20 and controlled mainly at a low frequency, while the lower electromagnet unit 62 is required to be disposed far from the center of gravity of the rotor 20 and controlled mainly at a high frequency. The respective structures of the upper electromagnet unit 61 and the lower electromagnet unit 62 may be selected as desired in accordance with this control characteristic.

Hence, according to the present disclosure, by setting the magnetic poles 66 of the radial electromagnets 63 that are adjacent to each other via the radial sensor 64 to be homopolar and disposing the radial sensor 64 in the low magnetic flux interference region formed between the adjacent radial electromagnets 63, magnetic interference received by the radial sensor 64 due to the strong magnetic flux of the radial electromagnet 63 is suppressed, and as a result, the radial sensor 64 can detect displacement of the rotor 20 in the radial direction R with precision.

Further, by forming the radial electromagnet 63 and the radial sensor 64 integrally in the upper electromagnet unit 61 or the lower electromagnet unit 62, the upper electromagnet unit 61 or the lower electromagnet unit 62 can be reduced in size and manufactured at low cost. Furthermore, by disposing the radial electromagnet 63 and the radial sensor 64 to be substantially coplanar in the axial direction A, oscillation of the upper electromagnet unit 61 or the lower electromagnet unit 62 can be suppressed, and displacement can be detected with precision. As a result, the rotor 20 can be supported with stability.

The present disclosure can be applied to an outer rotor type vacuum pump as well as an inner rotor type vacuum pipe. Note that the vacuum pump according to the present disclosure may of course be applied to a turbo-molecular pump alone or a full blade type vacuum pump as well as the combination vacuum pump described above.

Note that the present disclosure may be subjected to various amendments within a scope that does not depart from the spirit thereof, and needless to mention, the scope of the present disclosure includes these amendments.

1 Vacuum pump
10 Housing
11 Inlet port
12 Upper flange
20 Rotor
21 Rotor shaft
22 Rotor blade
23 Touchdown bearing
24 Boss hole
25 Bolt
26 Rotor flange
27 Shaft flange
30 Drive motor
31 Rotor
32 Stator
40 Stator column
41 Bolt
50 Base
51 Outlet port
52 O-ring
53 Stator
60 Radial direction magnetic bearing
61 Upper electromagnet unit
62 Lower electromagnet unit
63 Radial electromagnet (radial direction magnetic force generating means)
63a Coil (of radial electromagnet)
64 Radial sensor (radial direction displacement detecting means)
64a Coil (of radial sensor)
65 Core
66 Magnetic pole (of radial electromagnet)
67 Magnetic pole (of radial sensor)
68 Shield plate (magnetic shielding means)
69a Shield ring (magnetic shielding means)
69b Shield tube (magnetic shielding means)
70 Axial direction magnetic bearing
71 Axial electromagnet
72 Axial sensor
80 Stator blade
81 Spacer
90 Control means
91 Axis conversion unit
92 Control unit
A Axial direction
C Circumferential direction (of core)
R Radial direction
m Low magnetic flux interference region

What is claimed is:

1. An electromagnet unit comprising:
  a plurality of radial direction magnetic force generating means for supporting a rotating body in a radial direction by magnetic force without contact;
  a plurality of radial direction displacement detecting means for detecting displacement of the rotating body in the radial direction; and
  a core around which coils of the plurality of radial direction magnetic force generating means and coils of the plurality of radial direction displacement detecting means are wound, wherein
    two of the plurality of radial direction magnetic force generating means that are adjacent to each other in a circumferential direction of the core are disposed such that adjacent magnetic poles belonging respectively to the two of the plurality of radial direction magnetic force generating means are homopolar,
    a low magnetic flux interference region is formed between the two of the plurality of radial direction magnetic force generating means,
    each of the plurality of radial direction displacement detecting means is disposed in the low magnetic flux interference region,
    the plurality of radial direction displacement detecting means comprise two mutually different magnetic poles arranged in an axial direction of the rotating body, and
    magnetic poles to which the coils of the plurality of radial direction magnetic force generating means are wound do not overlap, in the radial direction, magnetic poles to which the coils of the plurality of radial direction displacement detecting means are wound.

2. The electromagnet unit according to claim 1, further comprising a magnetic shielding means for reducing a magnetic coupling between the plurality of radial direction magnetic force generating means and the plurality of radial direction displacement detecting means.

3. The electromagnet unit according to claim 2, wherein the magnetic shielding means is a conductive shield ring attached to the plurality of radial direction magnetic force generating means.

4. The electromagnet unit according to claim 2, wherein the magnetic shielding means is a conductive shield tube covering each of the coils of the plurality of radial direction displacement detecting means.

5. The electromagnet unit according to claim 1, wherein the plurality of radial direction magnetic force generating means comprise three magnetic poles arranged in the circumferential direction of the core so as to form two magnetic fluxes oriented in mutually opposite directions.

6. The electromagnet unit according to claim 1, wherein the plurality of radial direction magnetic force generating means comprise four magnetic poles arranged in the circumferential direction of the core so as to form two magnetic fluxes oriented in mutually opposite directions.

7. The electromagnet unit according to claim 1, wherein the plurality of radial direction magnetic force generating means comprise five or more magnetic poles arranged such that different polarities occur alternately in the circumferential direction of the core.

8. The electromagnet unit according to claim 1, wherein the core comprises an eddy current reducing means for reducing eddy currents generated when magnetic flux generated by the plurality of radial direction displacement detecting means in the axial direction passes through the core.

9. The electromagnet unit according to claim 8, wherein the eddy current reducing means is structured to reduce a passage sectional area where the magnetic flux generated by the plurality of radial direction displacement detecting means in the axial direction passes through the core.

10. The electromagnet unit according to claim 1, wherein
  each of the coils of the plurality of radial direction displacement detecting means is wound around two pawl portions projecting from the core toward an inner side in the radial direction, and
  a distance from a radial direction outer side end of each of the coils to a base end of the pawl portion is set to be greater than a distance between the two pawl portions.

11. The electromagnet unit according to claim 1, wherein a magnetic pole center of at least one of the plurality of radial direction magnetic force generating means and a magnetic pole center of at least one of the plurality of radial direction displacement detecting means are disposed on an identical plane.

12. A magnetic bearing device comprising:
an electromagnet unit comprising:
a plurality of radial direction magnetic force generating means for supporting a rotating body in a radial direction by magnetic force without contact;
a plurality of radial direction displacement detecting means for detecting displacement of the rotating body in the radial direction; and
a core around which coils of the plurality of radial direction magnetic force generating means and coils of the plurality of radial direction displacement detecting means are wound, wherein
two of the plurality of radial direction magnetic force generating means that are adjacent to each other in a circumferential direction of the core are disposed such that adjacent magnetic poles belonging respectively to the two of the plurality of radial direction magnetic force generating means are homopolar,
a low magnetic flux interference region is formed between the two of the plurality of radial direction magnetic force generating means,
each of the plurality of radial direction displacement detecting means is disposed in the low magnetic flux interference region,
the plurality of radial direction displacement detecting means comprise two mutually different magnetic poles arranged in an axial direction of the rotating body, and
magnetic poles to which the coils of the plurality of radial direction magnetic force generating means are wound do not overlap, in the radial direction, magnetic poles to which the coils of the plurality of radial direction displacement detecting means are wound; and
a control means for controlling the electromagnet unit.

13. The magnetic bearing device according to claim 12, further comprising a magnetic shielding means configured to reduce a magnetic coupling between the plurality of radial direction magnetic force generating means and the plurality of radial direction displacement detecting means, wherein the magnetic shielding means is a conductive shield plate interposed between the electromagnet unit and a substrate for connecting the coils of the plurality of radial direction displacement detecting means.

14. A vacuum pump comprising:
a magnetic bearing device comprising:
an electromagnet unit comprising:
a plurality of radial direction magnetic force generating means for supporting a rotating body in a radial direction by magnetic force without contact;
a plurality of radial direction displacement detecting means for detecting displacement of the rotating body in the radial direction; and
a core around which coils of the plurality of radial direction magnetic force generating means and coils of the plurality of radial direction displacement detecting means are wound, wherein
two of the plurality of radial direction magnetic force generating means that are adjacent to each other in a circumferential direction of the core are disposed such that adjacent magnetic poles belonging respectively to the two of the plurality of radial direction magnetic force generating means are homopolar,
a low magnetic flux interference region is formed between the two of the plurality of radial direction magnetic force generating means,
each of the plurality of radial direction displacement detecting means is disposed in the low magnetic flux interference region,
the plurality of radial direction displacement detecting means comprise two mutually different magnetic poles arranged in an axial direction of the rotating body, and
magnetic poles to which the coils of the plurality of radial direction magnetic force generating means are wound do not overlap, in the radial direction, magnetic poles to which the coils of the plurality of radial direction displacement detecting means are wound; and
a control means for controlling the electromagnet unit.

* * * * *